(12) United States Patent
Batra et al.

(10) Patent No.: US 11,829,703 B2
(45) Date of Patent: Nov. 28, 2023

(54) PARALLEL OBJECT ANALYSIS FOR EFFICIENTLY GENERATING LAYOUTS IN DIGITAL DESIGN DOCUMENTS

(71) Applicant: Adobe Inc., San Jose, CA (US)

(72) Inventors: Vineet Batra, Pitam Pura (IN); Ankit Phogat, Gurgaon (IN); Tarun Beri, Jagraon (IN)

(73) Assignee: Adobe Inc., San Jose, CA (US)

( * ) Notice: Subject to any disclaimer, the term of this patent is extended or adjusted under 35 U.S.C. 154(b) by 507 days.

(21) Appl. No.: 15/866,359

(22) Filed: Jan. 9, 2018

(65) Prior Publication Data
US 2019/0213238 A1   Jul. 11, 2019

(51) Int. Cl.
  *G06F 40/106*   (2020.01)
  *G06T 11/60*   (2006.01)
  *G06F 40/186*   (2020.01)

(52) U.S. Cl.
  CPC .......... *G06F 40/106* (2020.01); *G06F 40/186* (2020.01); *G06T 11/60* (2013.01)

(58) Field of Classification Search
  CPC .. G06F 17/212; G06F 17/248; G06F 3/04883; G06F 40/106; G06F 40/186; G06T 11/00; G06T 11/60; G06K 9/4671; G06K 9/4642; G06K 9/00463; G06K 9/00442; G06K 9/00456
  See application file for complete search history.

(56) References Cited

U.S. PATENT DOCUMENTS

| | | | |
|---|---|---|---|
| 7,272,258 B2 * | 9/2007 | Berkner | G06F 16/9577 382/176 |
| 7,848,596 B2 * | 12/2010 | Widdowson | G06T 11/60 358/1.2 |
| 9,229,939 B2 * | 1/2016 | McKenna | G06F 16/904 |
| 2003/0165273 A1 * | 9/2003 | Berkner | G06T 3/40 382/240 |
| 2004/0187078 A1 * | 9/2004 | Girgensohn | G06T 11/60 715/246 |
| 2006/0200759 A1 * | 9/2006 | Agrawala | G06F 17/211 715/209 |
| 2006/0269147 A1 * | 11/2006 | Shen | H04N 19/70 382/232 |
| 2007/0058884 A1 * | 3/2007 | Rother | G06K 9/469 382/284 |
| 2009/0002764 A1 * | 1/2009 | Atkins | G06T 11/60 358/1.18 |

(Continued)

OTHER PUBLICATIONS

Harrington, Steven, Aesthetic Measures for Automated Document Layout, All Pages, ACM (Year: 2004).*

(Continued)

*Primary Examiner* — Cesar B Paula
*Assistant Examiner* — Carl E Barnes, Jr.
(74) *Attorney, Agent, or Firm* — Keller Preece PLLC

(57) ABSTRACT

This disclosure covers methods, non-transitory computer readable media, and systems analyze a digital design document having an initial layout of digital objects and automatically generate candidate layouts by concurrently performing operations on the digital objects within the initial layout. By iteratively performing concurrent operations, in some implementations, the methods, non-transitory computer readable media, and systems produce multiple candidate layouts that the systems evaluate by generating design scores. Based on a comparison of such design scores, the methods, non-transitory computer readable media, and systems generate one or more modified layouts (from among the candidate layouts) for presentation to a user.

20 Claims, 14 Drawing Sheets

(56) References Cited

U.S. PATENT DOCUMENTS

| | | | | | |
|---|---|---|---|---|---|
| 2009/0146994 | A1* | 6/2009 | Goh | ............... | G06T 11/60 345/418 |
| 2010/0199227 | A1* | 8/2010 | Xiao | ............... | G06F 3/0481 715/863 |
| 2013/0222393 | A1* | 8/2013 | Merrell | ............... | G06T 11/00 345/441 |
| 2014/0363085 | A1* | 12/2014 | Li | ............... | G06K 9/6267 382/190 |
| 2015/0117784 | A1* | 4/2015 | Lin | ............... | G06K 9/4671 382/195 |
| 2017/0140250 | A1* | 5/2017 | Maloney | ............... | G06K 9/4642 |
| 2017/0169056 | A1* | 6/2017 | Brailovsky | ............... | G06T 3/40 |
| 2019/0139282 | A1* | 5/2019 | Rathore | ............... | G06T 11/60 |

OTHER PUBLICATIONS

Peter O'Donovan, Aseem Agarwala, Aaron Hertzmann, DesignScape: Design with Interactive Layout Suggestions, Proceedings of the 33rd Annual ACM Conference on Human Factors in Computing Systems, Apr. 18-23, 2015, Seoul, Republic of Korea.

Paul Merrell, Eric Schkufza, Zeyang Li, Maneesh Agrawala, Vladlen Koltun, Interactive furniture layout using interior design guidelines, ACM Transactions on Graphics (TOG), v.30 n.4, Jul. 2011.

Lap-Fai Yu, Sai-Kit Yeung, Chi-Keung Tang, Demetri Terzopoulos, Tony F. Chan, Stanley J. Osher, Make it home: automatic optimization of furniture arrangement, ACM Transactions on Graphics (TOG), v.30 n.4, Jul. 2011.

David Chek Ling Ngo, Lian Seng Teo, John G. Byrne, Modelling interface aesthetics, Information Sciences: an International Journal, v.152 n.1, p. 25-46, Jun. 2003.

Steven J. Harrington, J. Fernando Naveda, Rhys Price Jones, Paul Roetling, Nishant Thakkar, Aesthetic measures for automated document layout, Proceedings of the 2004 ACM symposium on Document engineering, Oct. 28-30, 2004, Milwaukee, Wisconsin, USA.

\* cited by examiner

PARALLEL OBJECT ANALYSIS FOR EFFICIENTLY GENERATING LAYOUTS IN DIGITAL DESIGN DOCUMENTS

BACKGROUND

Graphic designers and other artists increasingly use digital design editing systems to create and modify digital design documents. For example, some digital design editing systems enable artists to create and manipulate digital objects, such as photos, icons, or text within a digital design document. Indeed, some conventional design editing systems automatically propose adjustments to the position of digital objects within a digital document.

Although these conventional digital design editing systems can adjust digital objects within a digital design document, such systems have a number of shortcomings. For example, technical limitations of these conventional digital design editing systems slow down computing devices when processing design adjustments and produce invalid or aesthetically unsuitable designs. To illustrate, some conventional digital design editing systems that automatically propose adjustments consume significant computer-processing capacity and time. Moreover, when proposing adjustments to digital objects, some conventional digital design editing systems perform a limited set of operations that either do not (or inadequately) resemble the operations performed by a graphic designer or artist. Accordingly, such systems often produce invalid or aesthetically unsuitable arrangements of digital objects.

Because of these technical limitations, existing digital design editing systems sometimes provide a tedious and cumbersome user experience. The limitations in turn prompt some graphic designers to use individual editing tools to modify a digital design document one digital object at a time. In this case, the additional user input for singular digital-object adjustments further consumes computer-processing capacity and time.

SUMMARY

This disclosure describes one or more embodiments of methods, non-transitory computer readable media, and systems that solve the foregoing problems in addition to providing other benefits. For example, in one or more embodiments, the disclosed systems analyze a digital design document having an initial layout of digital objects and automatically generate candidate layouts by concurrently performing operations of different magnitudes on the digital objects. In some implementations, the disclosed systems also efficiently evaluate the candidate layouts by concurrently generating design scores to identify visually appealing layouts of the digital objects. By iteratively performing concurrent operations, the disclosed systems can more efficiently leverage the processing capabilities of graphics processing units to explore design variations and generate improved layouts for the digital design document.

For instance, in some embodiments the systems detect a digital design document having an initial layout of digital objects. The systems concurrently (a) perform a first operation on a first digital object using a first operation magnitude (based on a first entropy level) to generate a first candidate layout of the digital objects and (b) perform a second operation on a second digital object using a second operation magnitude (based on a second entropy level) to generate a second candidate layout of the digital objects. After generating the first and second candidate layouts, the systems determine a first design score for the first candidate layout and a second design score for the second candidate layout. Based on a comparison of the first design score and the second design score, the systems generate a modified layout of the digital objects.

BRIEF DESCRIPTION OF THE DRAWINGS

The detailed description refers to the drawings briefly described below.

DETAILED DESCRIPTION

Figure 1:
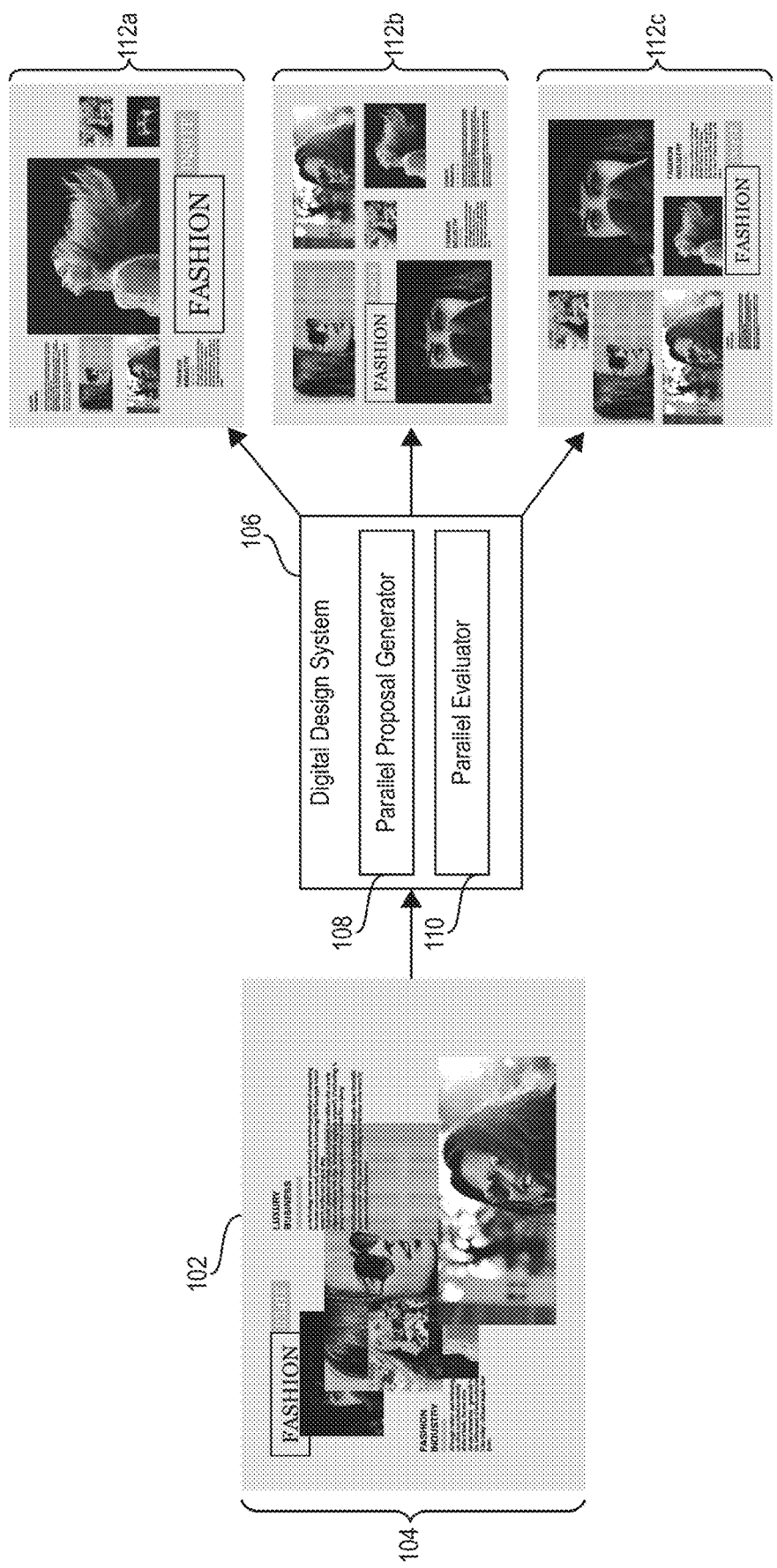
FIG. 1 illustrates generating modified layouts based on an initial layout of digital objects from a digital design document in accordance with one or more embodiments.

This disclosure describes one or more embodiments of a digital design system that analyzes a digital design document having an initial layout of digital objects and automatically generates a modified layout of the digital design document by concurrently performing operations on the digital objects. In particular, the digital design system can automatically and efficiently generate design layouts of the digital objects within the digital design document by iteratively applying operations at different operation magnitudes (in parallel) utilizing a graphics processing unit to modify layouts of digital design documents. Using different entropy levels, the digital design system performs operations at the different magnitudes on the digital objects within the digital document to generate candidate layouts. Furthermore, the digital design system can analyze the candidate layouts in parallel to generate design scores reflecting the visual appearance of the candidate layouts. Based on a comparison of such design scores, the digital design system can efficiently generate modified layouts for the digital design document with improved aesthetics.

For example, in some embodiments the digital design system detects a digital design document having an initial layout of digital objects. The digital design system then creates a first digital work group (e.g., a graphics processing unit work group) comprising a first digital object and a second digital work group comprising a second digital object. The digital design system can assign a first entropy level to the first digital work group and a second entropy level to the second digital work group. Moreover, the digital design system can create a first and a second candidate layout by concurrently (a) performing a first operation on the first digital object within the first digital work group using a first operation magnitude (based on the first entropy level) and (b) performing a second operation on the second digital object within the second digital work group using a second operation magnitude (based on a second entropy level). In one or more embodiments, after generating the first and second candidate layouts, the digital design system then determines a first design score for the first candidate layout and a second design score for the second candidate layout. Based on a comparison of the first design score and the second design score, the digital design system can generate a modified layout of the digital objects.

As just mentioned, the digital design system can utilize digital work groups corresponding to different entropy levels to determine operation magnitudes and explore design variations for digital objects within a digital design document. For example, in some embodiments, the digital design system utilizes a replica exchange Markov chain Monte Carlo method to iteratively apply different entropy levels to generate different candidate layouts reflecting the same or different operations applied at different operation magnitudes. Moreover, in certain implementations, the digital design system exchanges candidate layouts generated utilizing high entropy digital work groups with candidate layouts generated utilizing low entropy digital work groups.

To illustrate, during an initial iteration, the digital design system can perform a scaling operation for adjusting a size of a digital object at varying scaling magnitudes (based on different entropy levels). Moreover, the digital design system can generate candidate layouts reflecting the digital object at these varying scaling magnitudes. The digital design system can then select candidate layouts to pursue (e.g., using Metropolis-Hasting criteria) and swap the entropy level applicable to the selected candidate layouts. In particular, at subsequent iterations the digital design system can apply different entropy levels to candidate layouts to generate additional candidate layouts.

By applying different entropy levels at different iterations, the digital design system can analyze a wide array of different layouts (to avoid getting stuck in localized minima) while also exploring fine layout variations (to focus in on more optimal solutions). Furthermore, in applying these operations in parallel, the digital design system can more efficiently leverage graphical processing units to perform the operations more quickly and efficiently.

In any given iteration, the digital design system can also evaluate the validity and design of candidate layouts. For instance, the digital design system may determine the validity of candidate layouts based on a measure of overlap or a digital-design-document boundary. After determining validity, in some cases, the digital design system select and evaluate valid candidate layouts to determine a design score. Indeed, in certain embodiments, the digital design system quickly selects candidate layouts (from a set of valid candidate layouts) using a combination of balloting and random rotation. The digital design system can then concurrently determine design scores for the selected candidate layouts. In one such embodiment, the digital design system generates a single call to a graphics processing unit to concurrently determine design scores for the candidate layouts generated during an iteration.

When evaluating candidate layouts, in some implementations, the digital design system determines design scores based on design metrics that measure an aesthetic value of a layout. For instance, the digital design system may determine a design score for a layout based on one or more of the following design metrics: a layout-symmetry metric representing a level of symmetry among digital objects, a balance metric representing a distribution of optical weight among the digital objects in a layout, or some other design metric. As described below, the digital design system may use several design metrics to determine design scores and thus evaluate candidate layouts.

As set forth in this disclosure, the disclosed digital design system includes a variety of technical improvements that overcome some of the limitations of conventional digital design editing systems. As suggested above, some conventional digital design editing systems adjust a single digital object at a time. Similarly, certain conventional digital design editing systems evaluate digital objects by calculating one design score at a time. The digital design system can significantly improve performance speed relative to such conventional systems. Specifically, the digital design system can more efficiently leverage the processing power of graphical processing units by concurrently performing operations of different magnitudes based on different entropy levels on multiple digital objects via different graphical processing unit threads to generate candidate layouts. Moreover, the digital design system can also concurrently determine design scores for candidate layouts generated in a given iteration (e.g., utilizing highly efficient intrinsic operations across graphical processing unit threads). Accordingly, the digital design system expedites the computing process for generating and/or evaluating candidate layouts for a digital design document. Indeed, the disclosed digital design system can generate modified layouts two orders of magnitude faster than conventional digital design editing systems.

In addition to faster computer processing, the disclosed digital design system also generates layouts with higher design scores and fewer invalidities than conventional digital design editing systems. As suggested above, some conventional digital design software use operations that do not reflect human-like adjustments to digital objects or result in invalid designs (e.g., designs with text or images that exceed the boundaries of a digital design document). By performing more human-like operations at different operation magnitudes in parallel, the digital design system can more efficiently generate valid layouts (and weed-out invalid layouts in the parallel analysis). By one measure, the disclosed digital design system generates 97% valid candidate layouts compared to conventional digital design editing systems that generate only 67% valid candidate layouts. Additionally, after comparing design scores of candidate layouts, the digital design system generates modified layouts having higher design scores based on design metrics than the layouts generated by conventional digital design editing software.

Turning now to FIG. 1, this figure illustrates a digital design system generating modified layouts of digital objects based on an initial layout of the digital objects in accordance with one or more embodiments. As shown in FIG. 1, a digital design system 106 detects a digital design document 102 having an initial layout 104 of digital objects. Using the initial layout 104 as an input for an initial iteration, the digital design system 106 concurrently performs operations on the digital objects to generate candidate layouts (not shown) of the digital objects. The digital design system 106 determines design scores for a plurality of the candidate layouts. The digital design system 106 also utilizes one or more candidate layouts as inputs for an additional iteration and repeats the process of generating candidate layouts and determining design scores for selected candidate layouts. As shown in FIG. 1, after multiple iterations, the digital design system 106 generates modified layouts 112a-112c based on a comparison of the design scores.

As used in this disclosure, the term "digital design document" refers to a digital document comprising one or more digital objects. For example, a digital design document may include digital graphics, images, or icons. In addition to such digital graphics, images, or icons, in some embodiments, a digital design document includes text and/or characters as a digital object, such as text or characters in a textbox or text or characters presented in a distinctive typography. Accordingly, a digital design document often includes multiple digital objects, such as one or more digital graphics and text. As shown in FIG. 1, the digital design document 102 represents one example of a digital design document comprising multiple digital objects (e.g., digital images and text).

The term "digital object" refers to a computer-generated graphical or textual object. For example, a digital object may include a digital graphic, image, or icon, as well as digital text or digital characters. In some embodiments, a digital object includes both computer-generated graphical and textual objects. For instance, a digital object may include stylized text with a border or graphic-design elements surrounding (or intermixed with) text or characters. As shown in FIG. 1, the digital design document 102 includes several digital objects (e.g., the text block entitled "FASHION" or the digital image of a person).

In certain embodiments, a digital design document includes digital objects arranged in a layout. The term "layout" refers to a sizing, arrangement, or organization of digital objects within a digital design document. Accordingly, a layout may include digital objects of different sizes and digital objects positioned in different locations of a digital design document. As shown in FIG. 1, the initial layout 104 and the modified layouts 112a-112c represent examples of different layouts of the same digital objects.

As used in this disclosure, the term "initial layout" refers to a preliminary, original, starting, or input layout of a digital design document. In particular, an "initial layout" includes an arrangement of digital objects that a digital design system detects and modifies. Accordingly, an initial layout includes digital objects arranged in a layout when, for example, a client device sends an indication to the digital design system to propose modified layouts. By contrast, the term "candidate layout" refers to an alternative layout of digital objects for a digital design document. In some embodiments, a user may not see certain candidate layouts that a digital design system iteratively generates and evaluates. Rather, a digital design system generates candidate layouts as part of a process of finding alternative layouts of the digital objects to present to a user. Relatedly, the term "modified layout" refers to a layout chosen from among candidate layouts. For example, the term "modified layout" includes an alternative layout of digital objects generated for presentation to a user.

In some embodiments, a digital design system selects a candidate layout having a highest design score (or one of the highest design scores) as a modified layout. As shown in FIG. 1, the digital design system 106 selects three candidate layouts to present to a user as the modified layouts 112a, 112b, and 112c.

As further shown in FIG. 1, the digital design system 106 includes a parallel proposal generator 108. The parallel proposal generator 108 uses the initial layout 104 of digital objects as an input. Using the initial layout 104, the parallel proposal generator 108 concurrently performs (a) a first operation on one or more of the digital objects within the initial layout 104 using a first operation magnitude and (b) a second operation on one or more of the digital objects within the initial layout 104 using a second operation magnitude. The first operation and the second operation can be the same operation or different operations. By performing the operation at different magnitudes on digital objects of the digital design document 102, the parallel proposal generator 108 generates different candidate layouts of the digital objects.

As used in this disclosure, the term "operation" refers to a modification of a digital object. For instance, an operation includes moving or altering a size of a digital object. Among other possible operations, the digital design system 106 may perform a swapping operation that exchanges the positions of digital objects, a scaling operation for adjusting a size of a digital object, or a centering operation that moves a position of a digital object to a center position of a layout. This disclosure describes these and other operations with reference to FIGS. 4A-4B.

Relatedly, the term "operation magnitude" refers to a degree to which a digital design system performs an operation. For instance, the digital design system 106 may perform a scaling operation to adjust a size of a digital object at a first operation magnitude as well as perform the scaling operation to adjust a size of a different digital object (or same digital object in a different GPU thread) at a second operation magnitude. In one or more embodiments, the first operation magnitude differs from the second operation magnitude (e.g., the first operation magnitude may be lower than the second operation magnitude). Accordingly, continuing the previous example, the digital design system 106 may enlarge the digital object to a first size according to the first operation magnitude and enlarge a different (or same) digital object to a second (but larger) size according to the second operation magnitude. In the foregoing example, the operation magnitude affects the degree to which the digital design system 106 enlarges a digital object. Differing operation magnitudes likewise affect the degree to which the digital design system 106 performs other operations (e.g., swapping operation, centering operation).

To perform operations on digital objects, in certain embodiments, the parallel proposal generator 108 creates digital work groups. The term "digital work group" refers to a logical cluster for coordinating operations. For instance, in certain embodiments, a digital work group coordinates a graphics processing unit performing an operation on one or more digital objects using a particular operation magnitude. Continuing the example, the digital design system 106 may create a first digital work group that corresponds to a first entropy level and a second digital work group that corresponds to a second entropy level. Regardless of the operation performed, in certain embodiments, the digital design system 106 uses one digital work group to perform an operation using one operation magnitude (based on one entropy level) and another digital work group to perform the same (or different) operation using another operation magnitude (based on another entropy level). Accordingly, the digital design system 106 can vary operation magnitudes by using multiple digital work groups.

The term "entropy level" refers to a measure of variation in design. For example, entropy level includes a range, deviation, spread, or other measure of variation in operation magnitudes utilized to modify a design layout. Accordingly, a lower entropy level represents a lower variation (or range) in selecting operation magnitudes utilized to modify a digital object in a design layout, and a higher entropy level represents a higher variation (or range) of operation magnitudes utilized to modify a digital object in a design layout. Thus, an entropy level can indicate a range of operation magnitudes at which an operation may be performed.

In some embodiments, a digital work group may include one or more graphics-processing-unit threads. The term "graphics-processing-unit thread" or "GPU thread" refers to a logical portion of a digital work group that facilitates performing an operation on one or more digital objects. For instance, a GPU thread may be a Compute Unified Device Architecture ("CUDA") thread. In certain embodiments, the digital design system 106 dedicates a GPU thread to performing operations on a particular digital object at a particular operation magnitude. Accordingly, in some embodiments, a digital work group may include multiple GPU threads that are each dedicated to performing operations on a different digital object at a particular operation magnitude.

As an example, in one embodiment, the parallel proposal generator 108 creates a digital work group that includes, for each of the digital objects within the digital design document 102, a corresponding GPU thread dedicated to performing operations on the digital object. Put differently, within the digital work group, the parallel proposal generator 108 creates a GPU thread for each digital object. In some embodiments, in each iteration, the parallel proposal generator 108 determines an operation magnitude for each GPU thread based on the entropy level corresponding to the digital work group. Consistent with the disclosure above, the digital work group corresponds to a particular entropy level that includes a particular variation of operation magnitudes.

Similarly, the parallel proposal generator 108 creates an additional digital work group that includes, for each of the digital objects within the digital design document 102, a corresponding GPU thread dedicated to performing operations on the digital object. Within the additional digital work group, the parallel proposal generator 108 creates a GPU thread for each digital object to perform an operation using an operation magnitude based on a different entropy level. By creating multiple digital work groups that each include multiple GPU threads, the parallel proposal generator 108 facilitates concurrently performing an operation on digital objects.

As indicated by FIG. 1, the parallel proposal generator 108 instructs a graphics processing unit to execute multiple iterations of concurrently performing operations on digital objects. By concurrently performing operations, the parallel proposal generator 108 generates candidate layouts of the digital objects for the digital design document 102. In one iteration, for instance, for each GPU thread in each digital work group, the parallel proposal generator 108 performs an operation on the digital object corresponding to the GPU thread using an operation magnitude within the digital work group's particular entropy level. By using multiple digital work groups that each include multiple GPU threads, the parallel proposal generator 108 may perform (in parallel) an operation on each digital object within the digital design document 102. By performing the operations in parallel, the parallel proposal generator 108 generates several different candidate layouts of the digital objects.

In certain embodiments, the digital design system 106 uses a Bayesian model to configure the digital work groups and corresponding GPU threads, such as by using a Markov chain Monte Carlo algorithm. In particular, the digital design system 106 randomly selects an operation to perform and determines varying operation magnitudes at which to perform the operation in each digital work group. In some such embodiments, the digital design system 106 determines an operation magnitude for each GPU thread based on a normalized Gaussian distribution corresponding to each digital work group's particular entropy level. In terms of the Markov chain Monte Carlo algorithm, the candidate layouts correspond to the proposals generated in each iteration.

As further shown in FIG. 1, the digital design system 106 includes a parallel evaluator 110. The parallel evaluator 110 determines design scores for candidate layouts from the parallel proposal generator 108 in a given iteration. For instance, in some embodiments, the parallel evaluator 110 concurrently determines design scores for selected candidate layouts generated in an initial iteration. The parallel evaluator 110 may likewise determine design scores for selected candidate layouts generated in each additional iteration. When concurrently determining design scores, for instance, the parallel evaluator 110 may generate a single call to a graphics processing unit to determine design scores for selected candidate layouts.

As the digital design system 106 executes multiple iterations, the parallel proposal generator 108 generates candidate layouts and the parallel evaluator 110 in turn determines design scores for selected candidate layouts. The digital design system 106 then selects one or more candidate layouts as modified layouts to present to a user. As shown in FIG. 1, for instance, the digital design system 106 selects and generates the modified layouts 112a-112c for presentation to a user. In this particular example, the digital design system 106 selects candidate layouts having the highest three design scores as the modified layouts 112a-112c.

As mentioned above, in one or more embodiments, the digital design system 106 utilizes a replica exchange Markov chain Monte Carlo method to iteratively apply different operation magnitudes to different digital objects to generate candidate layouts. In particular, the digital design system 106 modifies digital objects based on a plurality of different entropy levels. For instance, the digital design system 106 determines operation magnitudes to apply to digital objects utilizing a normalized Gaussian distribution over entropy level (e.g., a normalized Gaussian distribution corresponding to the digital work group's particular entropy level). The digital design system 106 then performs operations at different operation magnitudes to generate candidate layouts.

Upon generating candidate layouts, in certain implementations, the digital design system 106 exchanges candidate layouts and applies different entropy levels at different iterations (e.g., based on Metropolis-Hastings criteria). Specifically, the digital design system 106 can exchange candidate layouts generated utilizing digital work groups corresponding to high entropy levels with candidate layouts generated utilizing digital work groups corresponding to low entropy levels. This results in a robust model that can explore the design space utilizing both high entropy levels and low entropy levels to identify improved layouts. Moreover, the digital design system 106 can perform computations for this approach in parallel for a plurality of digital objects at different operation magnitudes, which improves efficiency of implementation via a graphical processing unit.

Figure 2A:
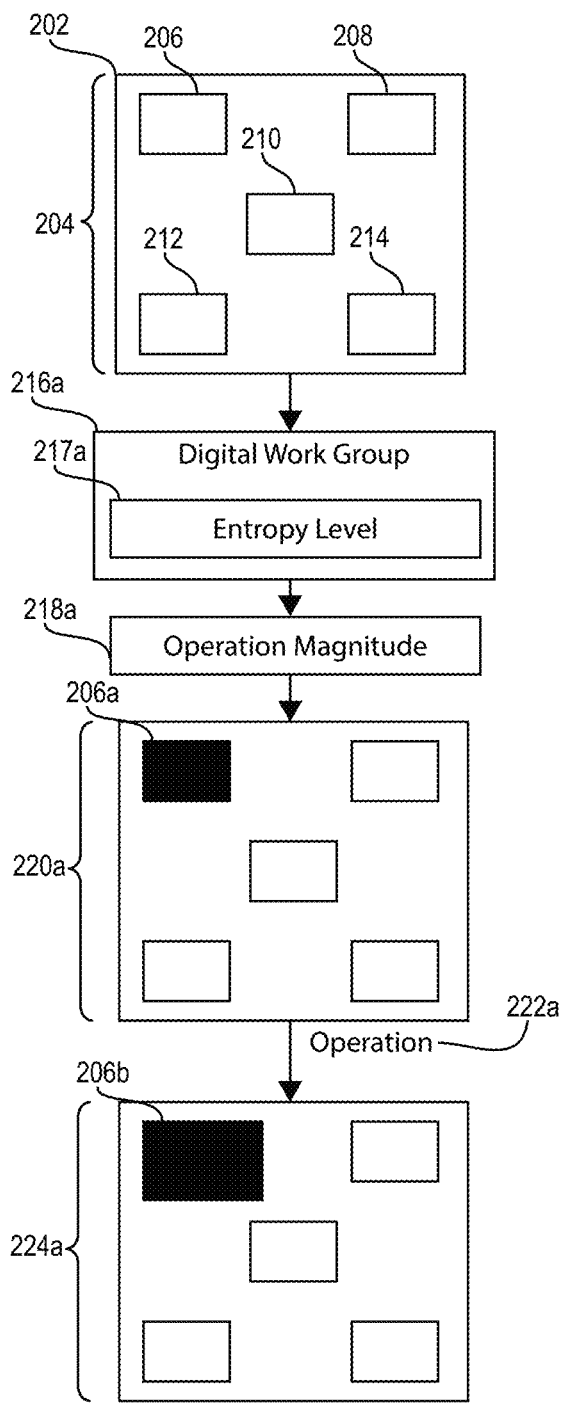
FIGS. 2A-2C illustrate flow diagrams of concurrently performing operations on digital objects from a digital design document having an initial layout and generating candidate layouts of the digital objects in accordance with one or more embodiments.
Figure 2B:
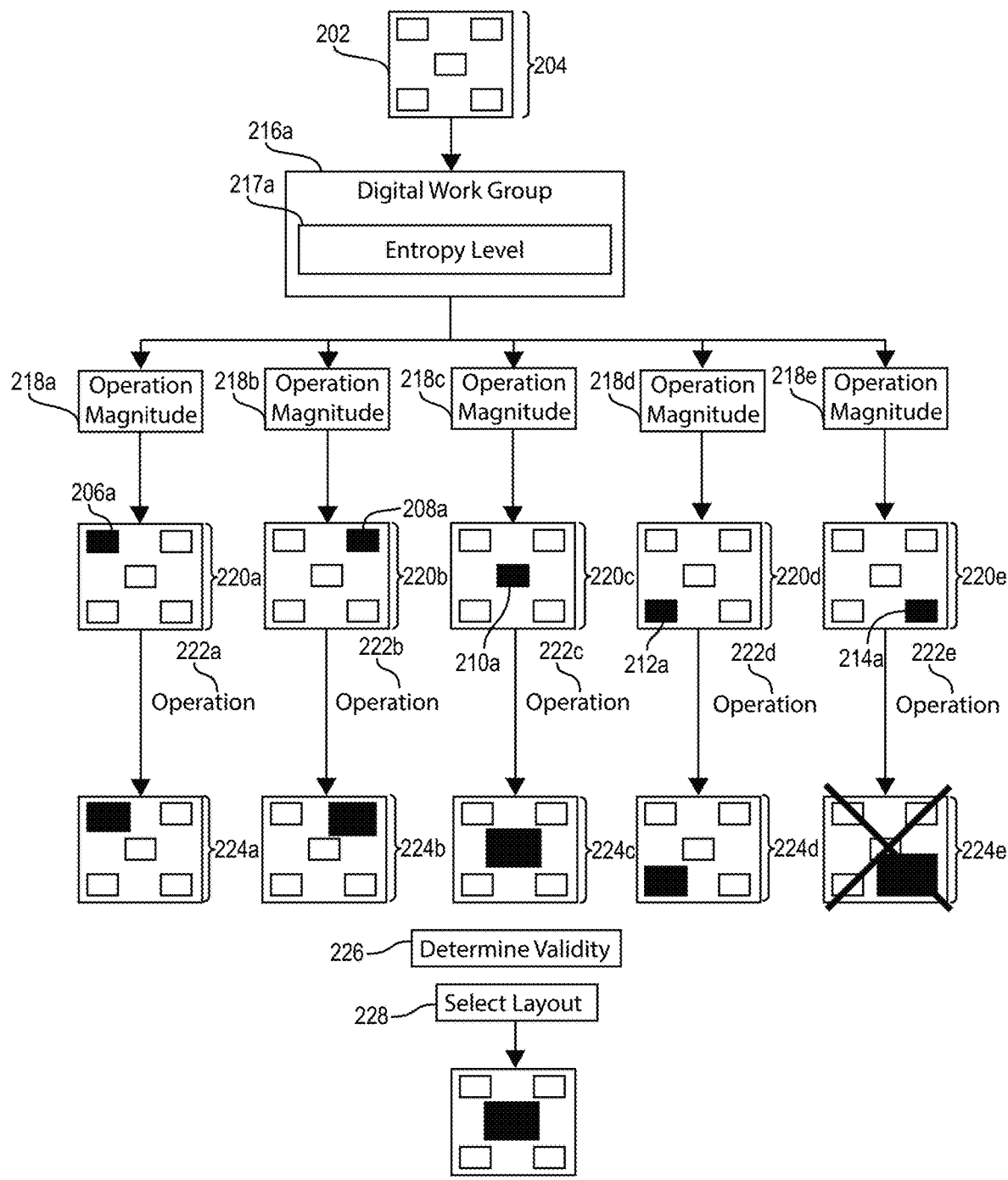
Figure 2C:
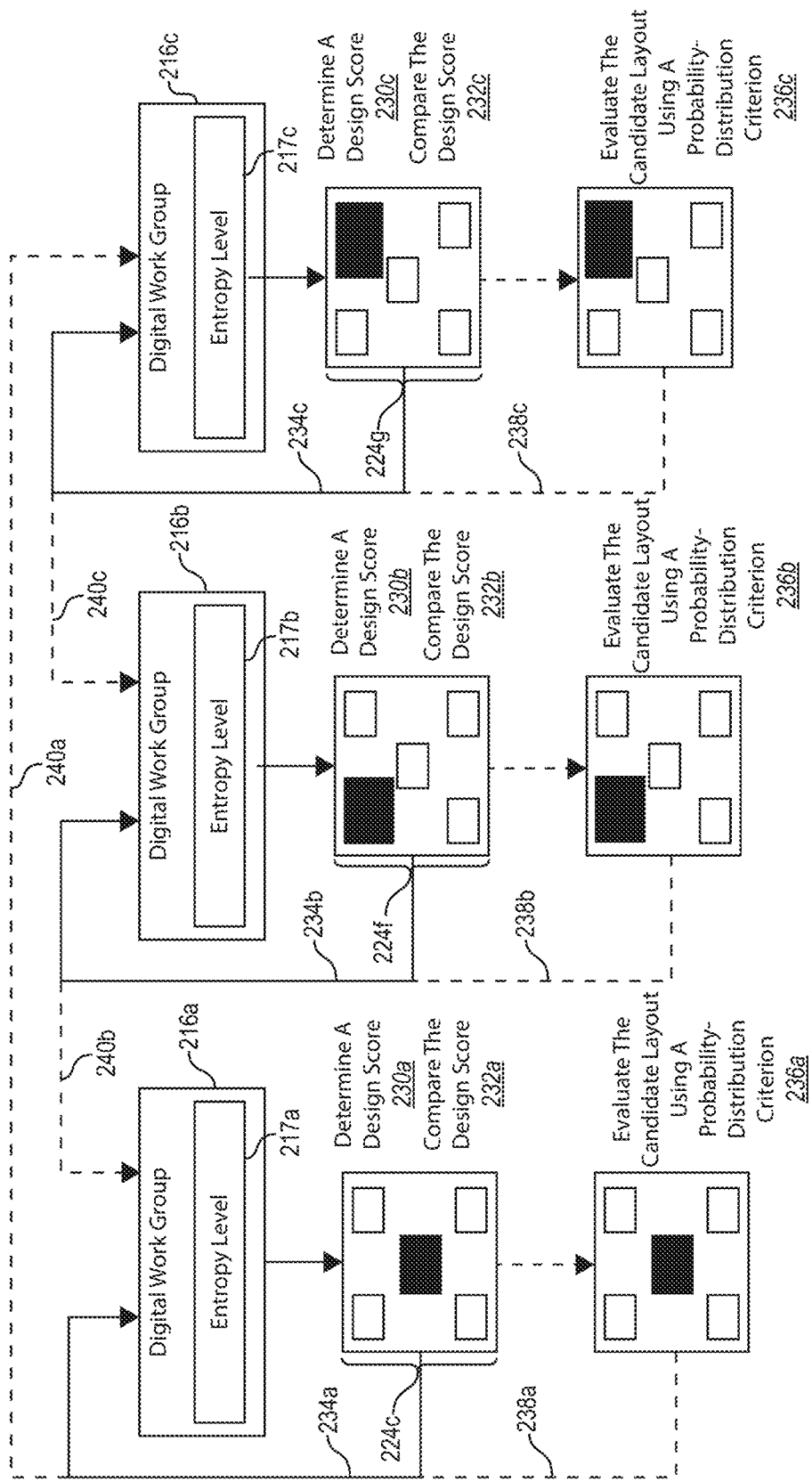

FIGS. 2A-2C provide additional detail in an example applying this approach. In particular, FIGS. 2A-2C illustrate the digital design system 106 concurrently performing operations on digital objects from a digital design document having an initial layout and generating (and determining design scores for) candidate layouts of the digital objects. As an overview, FIG. 2A illustrates the digital design system 106 creating a digital work group with a GPU thread and performing an operation on a digital object for the GPU thread. FIG. 2B illustrates the digital design system 106 using a digital work group comprising multiple GPU threads, performing the operation on different digital objects for each GPU thread, and selecting a candidate layout for the digital work group. FIG. 2C illustrates the digital design system 106 using multiple digital work groups to evaluate a selected candidate layout for each digital work group.

As shown in FIG. 2A, the digital design system 106 detects a digital design document 202 having an initial layout 204 of digital objects 206-214. For simplicity and purposes of explanation, FIG. 2A depicts a single digital work group and a single GPU thread that the digital design system 106 uses to perform an operation on a digital object. The digital design system 106 creates a first digital work group 216a that corresponds to a first entropy level 217a.

As suggested above, the digital design system 106 determines an operation magnitude for a GPU thread within the first digital work group 216a based on the first entropy level 217a. In particular, in certain embodiments, the digital design system 106 generates a normalized Gaussian distribution corresponding to the first entropy level 217a (e.g., a normalized Gaussian distribution for each operation centered on a mean operation magnitude for each operation). The digital design system 106 then selects an operation magnitude according to the normalized Gaussian distribution. Alternatively, the digital design system 106 determines an operation magnitude for a GPU thread based on a different type of probability distribution corresponding to a digital work group's particular entropy level. In some such embodiments, the digital design system 106 uses a Behrens-Fisher distribution, an exponentially modified Gaussian distribution, a Poisson distribution, or any other suitable probability distribution.

As shown in FIG. 2A, the first digital work group 216a includes a GPU thread 220a. The digital design system 106 determines a first operation magnitude 218a for the GPU thread 220a based on a normalized Gaussian distribution. In addition to determining the first operation magnitude 218a, the digital design system 106 dedicates the GPU thread 220a to performing operations on a digital object 206a. The digital object 206a represents the digital object 206 from the digital design document 202.

As further indicated by FIG. 2A, the digital design system 106 selects an operation to perform. In some circumstances, the digital design system 106 randomly selects an operation to perform. In other circumstances, the digital design system 106 can select an operation utilizing a different approach, such as by cycling through the operations in a pre-determined order. As shown in FIG. 2A, the digital design system 106 selects an operation 222a. While the operation 222a represents a scaling operation in FIG. 2A for purposes of illustration, in some embodiments, the digital design system 106 may select another operation, such as any of the operations depicted in FIGS. 4A-4B.

After selecting an operation, the digital design system 106 performs the operation 222a. Because the GPU thread 220a is dedicated to the digital object 206a, the digital design system 106 performs the operation 222a on the digital object 206a at the first operation magnitude 218a. As a result of the operation 222a, the digital design system 106 modifies the digital object 206a to become a modified digital object 206b. As further shown in FIG. 2A, the digital design system 106 generates a candidate layout 224a of digital objects from the digital design document 202. The candidate layout 224a differs from the initial layout 204 of the digital objects 206-214 in that the digital object 206 has been modified to become the modified digital object 206b.

As discussed above, the digital design system 106 can utilize multiple GPU threads to concurrently modify multiple digital objects and generate multiple candidate layouts. For example, FIG. 2B depicts the first digital work group 216a comprising multiple GPU threads—the GPU thread 220a and GPU threads 220b-220e. Similar to the GPU thread 220a, the digital design system 106 determines an operation magnitude for each of the GPU threads 220b-220e. In some embodiments, the digital design system 106 determines an operation magnitude for each of the GPU threads 220b-220e based on a probability distribution corresponding to the first entropy level 217a. As shown in FIG. 2B, the digital design system 106 determines operation magnitudes 218b, 218c, 218d, and 218e for GPU threads 220b, 220c, 220d, and 220e, respectively.

In addition to determining an operation magnitude for each GPU thread, the digital design system 106 dedicates each of the GPU threads 220b-220e to performing operations on a digital object. In particular, the digital design system 106 dedicates the GPU thread 220b to performing operations on a digital object 208a, the GPU thread 220c to performing operations on a digital object 210a, the GPU thread 220d to performing operations on a digital object 212a, and the GPU thread 220e to performing operations on a digital object 214a. The digital objects 208a, 210a, 212a, and 214a respectively represent the digital objects 208, 210, 212, and 214 from the digital design document 202.

As suggested above, the digital design system 106 uses the first digital work group 216a to coordinate operations among the GPU threads 220a-220e. Accordingly, in the embodiment shown in FIGS. 2A and 2B, when the digital design system 106 randomly selects an operation to perform for the GPU thread 220a, the digital design system 106 also randomly selects the operation to perform for each of the GPU threads 220a-220e. After selecting the operation, the digital design system 106 concurrently performs the operation 222a on the digital object 206a and operations 222b, 222c, 222d, and 222e on the digital objects 208a, 210a, 212a, and 214a, respectively.

As shown, by applying the operations 222a-222e at the operation magnitudes 218a-218e, the digital design system 106 modifies the digital object 206a to become the modified digital object 206b, the digital object 208a to become a modified digital object 208b, the digital object 210a to become a modified digital object 210b, the digital object 212a to become a modified digital object 212b, and the digital object 214a to become a modified digital object 214b. By modifying the digital objects 206a-214a, the digital design system 106 generates the candidate layouts 224a-224e of digital objects from the digital design document 202.

As shown in FIG. 2B, the candidate layouts 224a-224e represent candidate layouts for one iteration of the digital design system 106. Each of the candidate layouts 224a-224e differ from the initial layout 204 of the digital objects 206-214 in that a digital object has been modified (at the operation magnitudes 218a-218e) to become a modified digital object. In some embodiments, the digital design system 106 concurrently performs a same operation across all GPU threads in a digital work group to modify a digital object in each GPU thread.

In addition to generating candidate layouts, in some embodiments, the digital design system 106 evaluates the validity of candidate layouts. As indicated in FIG. 2B, the digital design system 106 performs an act 226 of determining a validity of each of the candidate layouts 224a-224e. In evaluating the validity of the candidate layouts 224a-224e, the digital design system 106 measures the overlap between digital objects within each of the candidate layouts 224a-224e and/or measures containment of the digital objects within a boundary for each of the candidate layouts 224a-224e. Based on measuring overlap and/or containment, the digital design system 106 determines that the candidate layout 224e is invalid. As shown in FIG. 2B, the candidate layout 224e includes digital objects that overlap with each other. An "X" marks the candidate layout 224e to indicate that the candidate layout 224e is invalid.

In addition to overlap and containment, in some embodiments, the digital design system 106 evaluates a candidate layout's validity based on different criteria. For example, in certain implementations, the digital design system 106 evaluates a candidate layout's validity based on whether certain types of digital objects overlap, such as by rejecting as invalid candidate layouts with digital images that overlap, but accepting as valid candidate layouts with a digital image and digital text that overlap. Additionally, or alternatively, in certain implementations, the digital design system 106 evaluates a candidate layout's validity based on whether digital objects obscure text or characters. For instance, the digital design system 106 may reject as invalid candidate layouts with digital objects that overlap (and that obscure text or characters) and accept as valid candidate layouts with digital objects that overlap (but that do not obscure text or characters). In addition to the validity criteria described above, the digital design system 106 may evaluate a candidate layout's validity using any suitable criteria.

As further shown in FIG. 2B, in addition to evaluating a candidate layout's validity, in some embodiments, the digital design system 106 selects a candidate layout, from among valid candidate layouts generated in a digital work group, to receive a design score. As suggested above, in certain implementations, the digital design system 106 randomly selects a candidate layout for each iteration of a digital work group to receive a design score from among the candidate layouts. As shown in FIG. 2B, the digital design system 106 performs the act 228 of selecting the candidate layout 224c to receive a design score.

As an example of random selection, in some embodiments, the digital design system 106 uses random rotation and balloting to efficiently select a candidate layout to receive a design score. In particular, the digital design system 106 assigns a bitflag to all valid candidate layouts generated for the first digital work group 216a (e.g., candidate layouts 224a-224e). The digital design system 106 further uses a ballot-intrinsic operation to accumulate candidate layouts from all GPU threads, including GPU threads from other digital work groups. The digital design system 106 then masks off bits (i.e., bitflags) corresponding to candidate layouts from the other digital work groups. After masking off such bits, the digital design system 106 randomly rotates the candidate layouts and selects the first candidate layout from among valid candidate layouts generated in a digital work group. Upon selecting this candidate layout, and as shown in FIG. 2C, the digital design system 106 then determines a design score for this randomly selected candidate layout.

In some embodiments, the digital design system 106 avoids additional iterations by generating multiple candidate layouts for a digital work group and selecting one such valid candidate layout to receive a design score. As noted above, by one measure, the digital design system 106 generates 97% valid candidate layouts compared to conventional digital design editing systems that generate only 67% valid candidate layouts. By generating both more candidate layouts and more valid candidate layouts in an iteration, the digital design system 106 avoids any additional iterations required to generate a valid candidate layout for a design score.

Although FIGS. 2A and 2B present actions in a particular order, the digital design system 106 may also perform the actions described above in a different order. For instance, the digital design system 106 can first select an operation for a GPU thread, then select a digital object for the GPU thread, then compute an operation magnitude for the GPU thread. To illustrate, in some embodiments, the digital design system 106 concurrently performs actions for each CUDA thread in a warp according to the following high-level code:

If the CUDA thread is the first CUDA thread in a warp:
    Randomly select an operation from a set of possible operations;
    Broadcast the selected operation to other CUDA threads in the warp using a _shfl operation;
Randomly select a digital object from a subset of digital objects for the CUDA thread;
Compute an operation magnitude based on an entropy level for the CUDA thread's digital work group;
Perform the operation on the digital object using the operation magnitude;
Determine the validity of a candidate layout and set a bitflag 'B' to true if valid, and a bitlag 'B' to false if invalid;
Use _ballot intrinsic to accumulate 'B' of all threads;
Mask off bits in other digital work groups;
If the CUDA thread is the first CUDA thread in the digital work group:
    Randomly select one out of all set bitflags 'B' for the digital work group using random rotate and pick first.

As noted above, FIG. 2B depicts an invalid candidate layout—the candidate layout 224e. In addition to rejecting invalid candidate layouts, in some embodiments, the digital design system 106 generates an additional candidate layout to replace the invalid candidate layout. Although not shown in FIG. 2B, the digital design system 106 may perform a randomly selected operation on the digital object 214a using the operation magnitude 218e or another operation magnitude determined by the digital design system 106. In some such embodiments, the digital design system 106 performs the randomly selected operation on the digital object 214a using the operation magnitude 218e (or different operation magnitudes) until it generates a valid candidate layout.

FIG. 2B also depicts the GPU threads 220a-220e as dedicated to performing operations on each digital object from the digital design document 202. In some embodiments, however, a digital work group may include fewer GPU threads than digital objects in a digital design document. For instance, in certain embodiments, a digital work group includes a maximum of 32 CUDA threads. In some such embodiments, when the number of digital objects exceeds the number of GPU threads in a digital work group, the digital design system 106 dedicates each GPU thread within the digital work group to a subset of the total digital objects. For example, the digital design system 106 may dedicate a GPU thread to an equally divided 17 subsets of 2 digital objects from a total of 34 digital objects (i.e., 2 digital objects per subset). As another example, the digital design system 106 may dedicate a GPU thread to unequally divided subsets, such as 27 subsets of 1 digital object and 5 subsets of 2 digital objects from a total of 37 digital objects. The digital design system 106 then randomly selects a digital object from the subset of digital objects on which to perform an operation during an iteration.

By contrast, in certain embodiments, when the number of digital objects within a digital design document is less than the number of half the available GPU threads in a digital work group, the digital design system 106 creates multiple digital work groups that use a same warp of GPU threads. For example, in some implementations, when the number of digital objects within a digital design document is less than 16 and the digital design system 106 identifies 32 available CUDA threads within a warp, the digital design system 106 creates two digital work groups that use the warp of 32 CUDA threads.

Regardless of whether a number of digital objects from a digital design document exceeds, matches, or falls below a number of available GPU threads, in some embodiments, the digital design system 106 may dedicate each GPU thread within a digital work group to a digital object using a variety of methods. For instance, in some embodiments, the digital design system 106 dedicates GPU threads to a subset of digital object using randomization, a round robin, or another suitable method.

As described above, the digital design system 106 can also evaluate selected candidate layouts and iteratively generate additional candidate layouts via replica exchange sampling among different digital work groups. For example, FIG. 2C illustrates multiple digital work groups where the digital design system 106 evaluates selected candidate layouts and re-introduces the selected candidates as input to workgroups in a subsequent iteration to generate additional candidate layouts.

Indeed, as noted above, in some embodiments, the digital design system 106 creates multiple digital work groups that correspond to different entropy levels. As shown in FIG. 2C, for example, the digital design system 106 creates the first digital work group 216a, a second digital work group 216b, and a third digital work group 216c respectively corresponding to the entropy level 217a, a second entropy level 217b, and a third entropy level 217c.

Although not shown in FIG. 2C, the digital design system 106 performs a similar process of generating and selecting candidate layouts for the second digital work group 216b and the third digital work group 216c as that depicted in FIG. 2B for the first digital work group 216a. Accordingly, the digital design system 106 concurrently performs (a) a first operation on digital objects in corresponding GPU threads of the first digital work group 216a using operation magnitudes from the first entropy level 217a, (b) a second operation on digital objects in corresponding GPU threads of the second digital work group 216b using operation magnitudes from the second entropy level 217b, and (c) a third operation on digital objects in corresponding GPU threads of the third digital work group 216c using operation magnitudes from the third entropy level 217c. Although FIG. 2C suggests that the first, second, and third operations are the same, the digital design system 106 alternatively performs a different randomly selected operation in each digital work group for an iteration. By concurrently performing such operations, the digital design system 106 generates candidate layouts for each of the digital work groups 216a, 216b, and 216c.

As shown in FIG. 2C, the digital design system 106 also selects a candidate layout to receive a design score from among the candidate layouts for each of the digital work groups 216a, 216b, and 216c. Consistent with the disclosure above concerning candidate-layout selection, the digital design system 106 respectively selects candidate layouts 224c, 224f, and 224g to receive a design score for the digital work groups 216a, 216b, and 216c.

After selecting candidate layouts, and as shown in FIG. 2C, the digital design system 106 concurrently performs the acts 230a, 230b, and 230c of determining a design score for each of the candidate layouts 224c, 224f, and 224g. As suggested above, in some embodiments, the digital design system 106 generates a single call to a graphics processing unit to concurrently determine design scores for each of the candidate layouts 224c, 224f, and 224g. In some such embodiments, the digital design system 106 concurrently determines design metrics for each selected candidate layout in parallel—as a basis for a design score for each selected candidate layout. Upon determining the design scores, the digital design system 106 compares each of the design scores for the candidate layouts 224c, 224f, and 224g to an initial design score for the initial layout 204. Accordingly, in addition to the design scores for the candidate layouts 224c, 224f, and 224g, the digital design system 106 determines an initial design score for the initial layout 204.

When determining a design score for a layout, in certain implementations, the digital design system 106 determines one or more design metrics as a basis for the layout's design score. For instance, the digital design system 106 may determine one or more of the following design metrics: (i) an alignment-points metric representing a level of alignment points for digital objects within a layout; (ii) a uniform-separation metric representing a determination of separation values among digital objects within the layout; (iii) a size-economy metric representing a level of different sizes among the digital objects within the layout; (iv) a layout-density metric representing a portion of the layout comprising the digital objects; (v) a layout-symmetry metric representing a level of symmetry among the digital objects within the layout based on one or more axes of the layout; (vi) a balance metric representing a distribution of optical weight among the digital objects in the layout; (vii) a simplicity metric representing a ratio of a number of digital objects and alignment points of the digital objects within the layout; (viii) a layout-unity metric representing a coherence of the digital objects; (ix) a layout-regularity metric representing a consistency of spacing among the digital objects within the layout; or (x) a focal-object metric representing a ratio of a size of a focal digital object of the digital objects to an additional size of an additional largest digital object within the layout.

The alignment-points metric reflects a level of alignment in a layout. The fewer the number of alignment points, the more aligned a layout may become. In some embodiments, the digital design system 106 measures left, top, right, bottom, and center alignment.

The uniform-separation metric measures how well digital objects are spread across a layout. In some embodiments, the more uniform the separation across the layout, the better the value for the uniform-separation metric.

The size-economy metric measures how many different sizes of digital objects exist in a layout. The fewer number of different design sizes, the better the value for the size-economy metric.

The layout-density metric measures how much of the layout is covered by digital objects. In some embodiments, the digital design system 106 uses a threshold of 70% for digital objects covering a layout to determine a layout-density metric. Other threshold percentages may be used. In certain implements, layouts with a denser (or sparser) covering of digital objects than a threshold percentage receive a lower value for a layout-density metric.

The layout-symmetry metric measures axial duplication. In certain implementations, axial duplication represents a unit on one side of a center line replicated on the other side of the center line. In some embodiments, the digital design system 106 uses as a center line for vertical symmetry—with a balanced arrangement of equivalent digital objects about a vertical axis. Additionally, or alternatively, in some embodiments, the digital design system 106 uses a center line for horizontal symmetry—with a balanced arrangement of equivalent digital objects about a horizontal axis. Additionally, or alternatively, in some embodiments, the digital design system 106 uses a center line for horizontal symmetry for radial symmetry—with a balance arrangement of equivalent digital objects balanced about two or more axes that intersect at a central point.

As noted above, the balance metric represents a distribution of optical weight among digital objects within a layout. Optical weight refers to the perception that some digital objects appear heavier than others. Larger digital objects are heavier, whereas smaller digital objects are lighter. A balanced layout provides an equal weight to digital objects— for both left and right, and top and bottom. In some embodiments, the digital design system 106 determines the balance metric as the difference between total weighting of components on each side of the horizontal and vertical axis.

The simplicity metric measures directness and singleness of form, which is a combination of elements that results in ease in comprehending the meaning of a pattern. A layout that optimizes the number of digital objects on a screen and minimizes the alignment points achieves an ideal simplicity.

The unity metric measures unity as coherence—a totality of elements that is visually all one piece. When a layout has a relatively high value for a unity metric, the digital objects seem to belong together, to dovetail so completely that they are seen as one thing. A layout that uses similar sizes and leaves less space between digital objects than the space left at the margins achieves a high value for a unity metric.

The layout-regularity metric measures uniformity of digital objects based on some principle or plan. A layout achieves regularity by establishing standard and consistently spaced horizontal and vertical alignment points for digital objects and minimizing the alignment points. Regularity, by definition, is a measure of how regular the layout is.

The focal-object metric reflects a measure of focus for a key element (i.e., a focal digital object) in the digital design document. A focal digital object may be a logo for a company; a photo of an athlete, model, or artwork; a photo of a product being advertised; or some other focal point of the layout. The digital design system 106 can identify the key element based on user input or automatically (e.g., based on color, size, or shape).

For example, in one or more embodiments, the digital design system 106 generates the focal-object metric (or design metric (x)) based on (a) a size of a focal digital object of the digital objects within a layout and (b) a size of the largest additional digital object within the layout (i.e., the largest digital object that is not the focal digital object). By measuring the sizes of the focal digital object and the largest additional digital object, the digital design system 106 determines a measured ratio of the focal digital object's size to the largest additional digital object's size. The digital design system 106 then compares a threshold ratio to the measured ratio for the layout.

In one embodiment, for instance, the threshold ratio indicates a focal digital object's size is twice as large as the largest additional object's size. To determine the focal-object metric, the digital design system 106 assigns a value of between 0 and 1 representing the difference between the measured ratio and the threshold ratio—with a focal-object metric of 0 representing a largest difference and a focal-object metric of 1 representing that the measured ratio is greater than or equal to the threshold ratio. In additional embodiments, the digital design system 106 may use a different threshold ratio to determine a focal-object metric (e.g., a focal digital object's size is 2.5 times as large as the largest additional object's size).

In certain embodiments, the digital design system 106 determines the design metrics (i) and (ii) as described for "alignment" and "uniform separation," respectively, by Steven Harrington et al., "Aesthetic Measures for Automated Document Layout," Proceedings of the 2004 ACM Symposium on Document Engineering 109-111 (2004) (hereinafter "Harrington"), the entire contents of which are hereby incorporated by reference. Similarly, in certain embodiments, the digital design system 106 determines the design metrics (iii), (iv), (v), (vi), (vii), (viii), and (ix) as described for measures of economy, density, symmetry, balance, simplicity, unity, and regularity, respectively, by David Chek Ling Ngo et al., "Modeling Interface Aesthetics," 152 Information Sciences 25-46 (2003), the entire contents of which are hereby incorporated by reference.

As indicated by FIG. 2C, the digital design system 106 uses one or more of the design metrics (i)-(x) to determine a design score for the candidate layouts 224c, 224f, and 224g. In some embodiments, the digital design system 106 determines a design score based on design metrics (i)-(x). Regardless of how many of the design metrics (i)-(x) are used, in certain implementations, each of the design metrics (i)-(x) represent a normalized value. For example, each of the design metrics may be normalized between 0 and 1—with a value of 0 representing a worst value for a design metric and a value of 1 representing a best value for a design metric. In some such embodiments, the digital design system 106 determines the design score by determining a weighted average or sum of the values for each design metric. The digital design system 106 optionally applies an empirically determined weight to the design metrics when determining the weighted average. For instance, in certain embodiments, the digital design system 106 uses Harrington's equation for combining measures, where the term "V" in Harrington's equation represents the design score for a given layout.

Regardless of the method used to determine a design score based on design metrics, in some embodiments, the digital design system 106 concurrently reduces design metrics for each selected candidate layout in parallel to determine a design score for each selected candidate layout. For example, the digital design system 106 may use a graphics processing unit to determine a weighted average of the values for each design metric—for each selected candidate layout in an iteration—in parallel. Accordingly, in certain implementations, the digital design system 106 not only concurrently determines individual design metrics for each selected candidate layout, but also concurrently reduces those design metrics to a design score for each selected candidate layout (e.g., by concurrently adding the same design metrics across candidate layouts in parallel utilizing the same commands). Alternatively, in some embodiments, the digital design system 106 determines design metrics and design scores sequentially.

As noted above, in some embodiments, the digital design system 106 uses a single call to a graphics processing unit to concurrently determine design scores for selected candidate layouts. In some such embodiments, the digital design system 106 uses CUDA-intrinsic operations and CUDA threads in parallel to efficiently and concurrently determine design metrics as a basis for a design score. For instance, in some implementations, the digital design system 106 sends a call to a graphics processing unit to employ warp-based intrinsic operations across multiple CUDA threads to concurrently determine design metrics for multiple selected candidate layouts. Some such intrinsic operations include shuffle ("_shfl"), shuffle up ("_shfl_up"), shuffle down ("_shfl_down"), shuffle exclusion or ("_shfl_xor"), and sort. Unlike conventional digital design editing software that determines design metrics sequentially, the digital design system 106 concurrently determines design metrics (and larger design scores) for selected candidate layouts by using efficient warp-based intrinsic operations in parallel. Accordingly, the digital design system 106 can utilizes a rapid reduction technique that reduces design scores in parallel using highly efficient warp based intrinsic operations across all GPU threads that are part of a warp.

In one embodiment, the digital design system 106 concurrently determines design metrics using the following high-level code for each CUDA thread in a CUDA warp in parallel:

For each design metric:
    Determine a value for the design metric for a digital work group; and
    Determine a weighted average of values for all design metrics.

As further shown in FIG. 2C, after determining design scores, the digital design system 106 performs the acts 232a, 232b, and 232c of comparing the design score for each of the candidate layouts 224c, 224f, and 224g to an initial design score for the initial layout 204. In some embodiments, if the design score for the candidate layout 224c, 224f, or 224g exceeds the design score for the initial layout 204, the digital design system 106 uses the candidate layout 224c, 224f, or 224g as an input for a subsequent iteration of the corresponding digital work group.

For example, in some embodiments, if the design score for the candidate layout 224g exceeds the design score for the initial layout 204, the digital design system 106 uses the candidate layout 224g as an input for the next iteration of the third digital work group 216c. Accordingly, during the next iteration of some embodiments, the third digital work group 216c performs an operation on digital objects within the candidate layout 224g. FIG. 2C depicts input pathways 234a, 234b, and 234c from the candidate layouts 224c, 224f, and 224g to the digital work groups 216a, 216b, and 216c, respectively. The input pathways 234a, 234b, and 234c represent the digital design system 106 using the candidate layouts 224c, 224f, and 224g as inputs for a subsequent iteration of the digital work groups 216a, 216b, and 216c, respectively. In subsequent iterations, the digital design system 106 determines additional design scores for additional candidate layouts and compares the additional design scores to a design score for the candidate layout used as an input.

In some cases, however, the design score for a candidate layout falls below the initial design score for the initial layout 204. As further shown in FIG. 2C, when the design score for the candidate layouts 224c, 224f, or 224g falls below the initial design score for the initial layout 204, in certain implementations, the digital design system 106 respectively performs acts 236a, 236b, or 236c of evaluating the candidate layout 224c, 224f, or 224g using a probability-distribution criterion. The digital design system 106 uses the probability-distribution criterion to determine a likelihood that additional operations on digital objects within a candidate layout will improve the design score to exceed the initial design score (or, for later iterations, exceed the design score of a candidate layout used as an input).

For example, in some embodiments, the digital design system 106 evaluates the candidate layouts 224c, 224f, or 224g against Metropolis-Hastings criterion. Using the Metropolis-Hastings criterion, the digital design system 106 simulates samples of candidate layouts (with additional operations to modify constituent digital objects) that are derived from a candidate layout having an inadequate design score. In some such embodiments, to simulates the samples of candidate layouts, the digital design system 106 uses a probability distribution compatible with a Markov chain Monte Carlo algorithm.

When the candidate layout satisfies the probability-distribution criterion, the digital design system 106 accepts the candidate layout by using the candidate layout as an input for a subsequent iteration of the corresponding digital work group. Accordingly, FIG. 2C depicts input pathways 238a, 238b, and 238c optionally connecting the candidate layouts 224c, 224f, and 224g and the digital work groups 216a, 216b, and 216c, respectively. The input pathways 238a, 238b, and 238c represent the digital design system 106 optionally using the candidate layouts 224c, 224f, and 224g as inputs for a subsequent iteration of the digital work groups 216a, 216b, and 216c, respectively, based on a probability-distribution criterion.

By contrast, when the candidate layout does not satisfy the probability-distribution criterion (i.e., fails to satisfy the probability-distribution criterion and also fails to improve the design score), in certain embodiments, the digital design system 106 rejects the candidate layout and does not use the candidate layout as an input for a subsequent iteration. Instead, the digital design system 106 uses the initial layout 204 (or another candidate layout) as an input for the next iteration. In other words, when the digital design system 106 rejects the candidate layout generated in a particular iteration, in some embodiments, the digital design system 106 uses the layout that it previously used as an input for the next iteration.

In addition (or in the alternative) to using a candidate layout generated for a digital work group as an input for a next iteration of the digital work group, in some implementations, the digital design system 106 exchanges candidate layouts that receive a design score among digital work groups as inputs for the next iteration. Alternatively, in some embodiments, the digital design system 106 exchanges entropy levels among digital work groups between certain iterations to perform operation magnitudes from different entropy levels on digital objects within candidate layouts output of a digital work group.

Because each digital work group has differing entropy levels, a digital work group corresponding to a higher entropy level will tend to use the higher operation magnitude for operations in each iteration. Consequently, digital work groups corresponding to higher entropy levels tend to have fewer operations that explore nuanced variations of a digital object on which the digital design system 106 previously performed an operation of higher operation magnitude. By exchanging candidate layouts having design scores among digital work groups—or exchanging entropy levels among digital work groups—the digital design system 106 can make available candidate layouts generated in a digital work group corresponding to a higher entropy level to a digital work group corresponding to a lower entropy level (and vice versa). This exchange further enables the digital design system 106 to explore more nuanced variations of the digital object on which the digital design system 106 previously performed an operation of higher operation magnitude.

For example, in some embodiments, the digital design system 106 uses a replica exchange Markov chain Monte Carlo sampling to exchange candidate layouts that receive a design score among digital work groups as inputs. In some such embodiments, the digital design system 106 evaluates the candidate layouts 224c, 224f, or 224g against a Metropolis-Hastings criterion. If the candidate layout 224c, 224f, or 224g satisfies the Metropolis-Hastings criterion, the digital design system 106 uses the candidate layout 224c, 224f, or 224g in an exchange. FIG. 2C depicts input pathways 240a, 240b, and 240c optionally connecting the candidate layouts 224c, 224f, and 224g and the digital work groups 216c, 216a, and 216b, respectively. The input pathways 240a, 240b, and 240c represent the digital design system 106 optionally exchanging the candidate layouts 224c, 224f, and 224g as inputs for a subsequent iteration among the digital work groups 216a, 216b, and 216c based on a probability-distribution criterion using replica exchange Markov chain Monte Carlo sampling.

The digital design system can utilize a variety of approaches for exchanging candidate layouts among different digital work groups. For instance, in some embodiments, the digital design system 106 exchanges candidate layouts (that receive a design score) among digital work groups as inputs at each iteration, at certain predetermined iterations (e.g., every 10 iterations), or at random iterations.

Regardless of whether the digital design system 106 exchanges candidate layouts among digital work groups as inputs, in some embodiments, the digital design system 106 performs multiple iterations of the actions depicted in FIGS. 2A-2C. Accordingly, in certain implementations, the digital design system 106 generates candidate layouts; determines design scores for selected candidate layouts; and uses some or all of the selected candidate layouts (or candidate layouts selected for previous iterations) as inputs for a next iteration. In some such embodiments, the digital design system 106 performs a predetermined number of iterations, such as by performing a limit of 500 or 750 iterations.

By contrast, in certain implementations, the digital design system 106 performs iterations until the design scores for candidate layouts do not improve by a significant amount. When the design scores for candidate layouts do not improve by a significant amount, in some embodiments, the digital design system 106 converges on a candidate layout (or variations of a candidate layout) having a relatively high design score.

For example, when the digital design system 106 uses a Markov chain Monte Carlo algorithm, in certain implementations, the digital design system 106 converges on variations of a candidate layout having a relatively high design score. By evaluating a variation of such a candidate layout using the Metropolis-Hastings criterion, the digital design system 106 determines that a probability of improving the candidate layout's design score (or a variation of the candidate layout's design score) is relatively low. This low probability marks a point of convergence. In some such embodiments, the digital design system 106 finishes performing iterations at the point of convergence and selects one or more candidate layouts to generate as modified layouts.

For instance, in certain embodiments, the digital design system 106 performs a Markov chain Monte Carlo replica exchange according to the following high-level code:

For each entropy level:
  Loop for a fixed number of iterations (e.g., 750 iterations);
    Generate a candidate layout from the initial layout;
    If the candidate layout is valid:
      Evaluate the candidate layout and determine a value for all design metrics;
      If the candidate layout satisfies a Metropolis-Hastings criterion for the design score of the candidate layout and the initial layout, then accept the candidate layout.

Figure 3A:
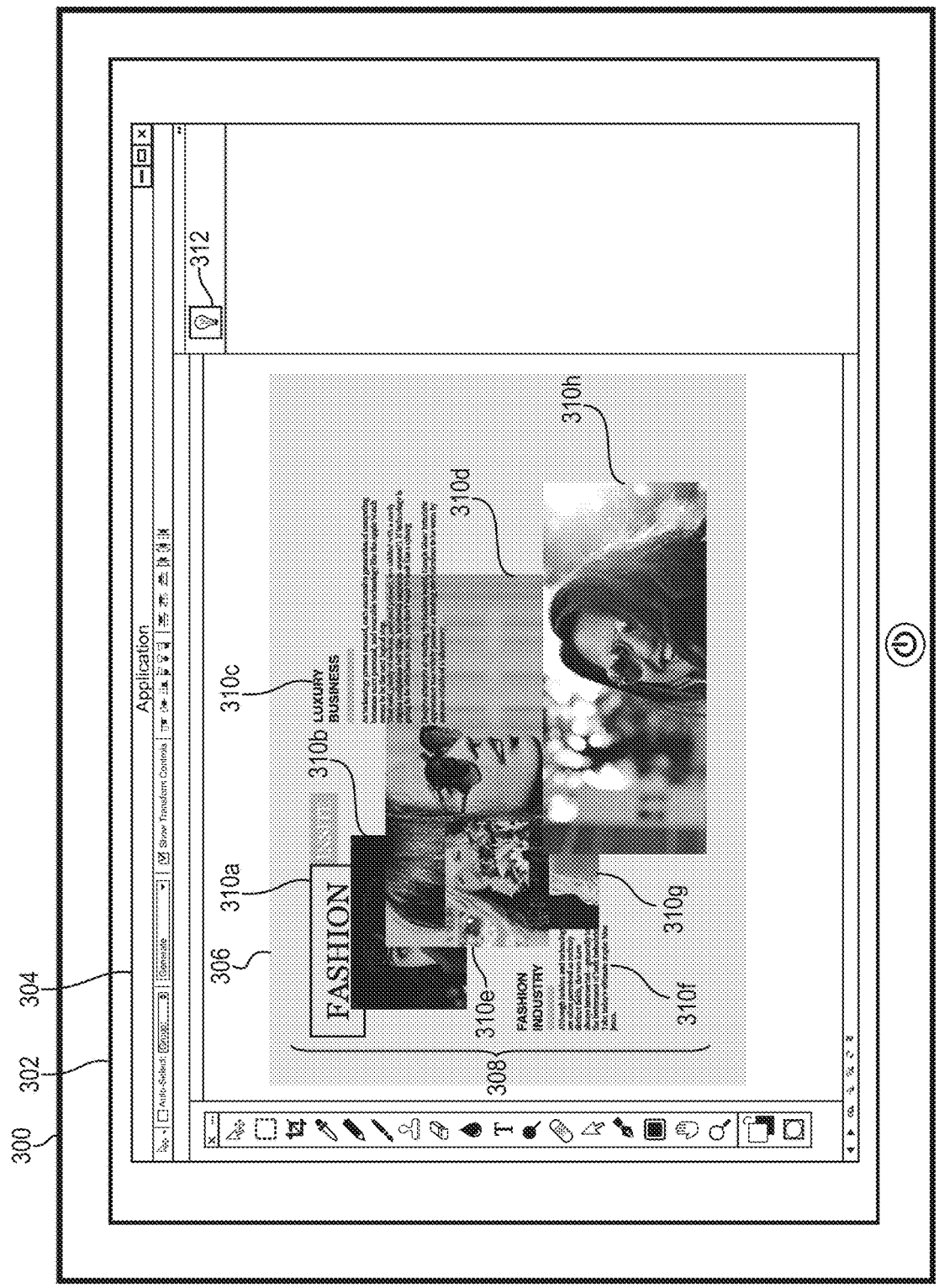
FIGS. 3A-3B illustrate graphical user interfaces of a client device presenting an initial layout of digital objects from a digital design document and modified layouts of the digital objects in accordance with one or more embodiments.
Figure 3B:
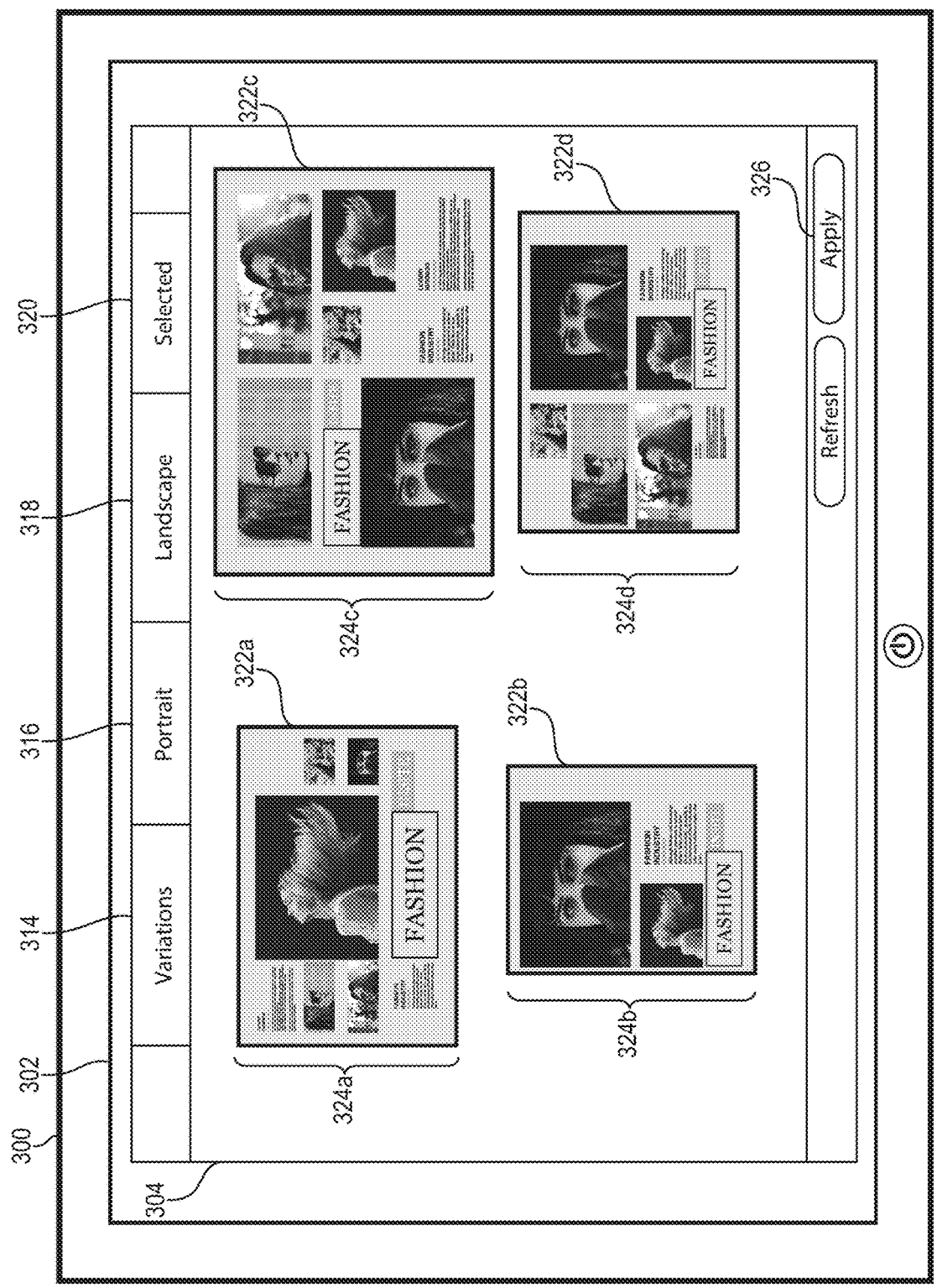

As noted above, in some embodiments, the digital design system 106 selects certain candidate layouts based on a comparison of design scores and generates the selected candidate layouts as modified layouts for presentation to the user. FIGS. 3A-3B illustrate a client device presenting an initial layout of digital objects from a digital design document and—in response to detecting a selection of a layout-suggestion option—presenting modified layouts of the digital objects. Accordingly, FIGS. 3A-3B depict graphical user interfaces from the perspective of a client device that implements the digital design system 106 described above in FIGS. 2A-2C.

As shown in FIG. 3A, a client device 300 presents a graphical user interface 304 within a screen 302. The graphical user interface 304 includes a digital design document 306 having an initial layout 308 of digital objects 310a-310h. The graphical user interface 304 also includes a layout-suggestion option 312. The client device 300 detects a selection by a user of the layout-suggestion option 312, such as by touch gesture or mouse click. Based on receiving an indication of the selection of the layout-suggestion option 312, the digital design system 106 performs the process described above with reference to FIGS. 2A-2C. Among other things, the digital design system 106 concurrently performs operations on the digital objects 310a-310h (via a graphical processing unit of the client device 300) to generate candidate layouts of the digital objects 310a-310h, determines design scores for selected candidate layouts, and generates modified layouts of the digital objects 310a-310h for presentation on the client device 300.

After performing these actions, and as shown in FIG. 3B, the client device 300 updates the graphical user interface 304 to include digital design thumbnails 322a, 322b, 322c, and 322d respectively having modified layouts 324a, 324b, 324c, and 324d of the digital objects 310a-310h. The modified layouts 324a-324d represent candidate layouts having the highest four design scores from among multiple candidate layouts generated by the digital design system 106 in multiple iterations. As shown, each of the modified layouts 324a-324d include modifications of the digital objects 310a-310h in an arrangement that differs from the initial layout 308.

As further shown in FIG. 3B, the graphical user interface 304 also includes a selected-layout option 320. The modified layouts 324*a*-324*d* correspond to the selected-layout option 320. Accordingly, when the client device 300 detects a selection by a user of the selected-layout option 320, the client device 300 updates the graphical user interface 304 to include digital design thumbnails of the four candidate layouts having the highest design scores—that is, the modified layouts 324*a*-324*d*.

In addition to the selected-layout option 320, the graphical user interface 304 includes a variation-layout option 314, a portrait-layout option 316, and a landscape-layout option 318. These options trigger the client device 300 to present variations of the modified layouts 324*a*-324*d* or different candidate layouts. When the client device 300 detects a selection by a user of the variation-layout option 314, for instance, the client device 300 updates the graphical user interface 304 to include variations of the modified layouts 324*a*-324*d* in digital design thumbnails, such as the modified layouts with different background designs. By contrast, when the client device 300 detects a selection by a user of the portrait-layout option 316, the client device 300 updates the graphical user interface 304 to include candidate layouts in portrait format having the highest design scores generated by the digital design system 106 (e.g., the four candidate layouts in portrait format having the highest design scores). Similarly, when the client device 300 detects a selection by a user of the landscape-layout option 318, the client device 300 updates the graphical user interface 304 to include candidate layouts in landscape format having the highest design scores generated by the digital design system 106 (e.g., the four candidate layouts in landscape format having the highest design scores).

In addition to the different layout options, the graphical user interface 304 further includes a document-generation option 326. When the client device detects a selection by a user of the document-generation option 326, the client device 300 generates digital design documents having the modified layouts 324*a*-324*d*. As shown in FIG. 3B, the digital design thumbnails 322*a*-322*d* provide a preview of the modified layouts 324*a*-324*d*, but do not enable the client device 300 to adjust individual digital objects. By contrast, digital design documents having the modified layouts 324*a*-324*d* enable the client device 300 to further adjust each of the digital objects 310*a*-310*h* in each respective modified layout. In alternative embodiments, based on receiving an indication of a selection of the layout-suggestion option 312, the digital design system 106 generates digital design documents having the modified layouts 324*a*-324*d*.

Figure 4A:
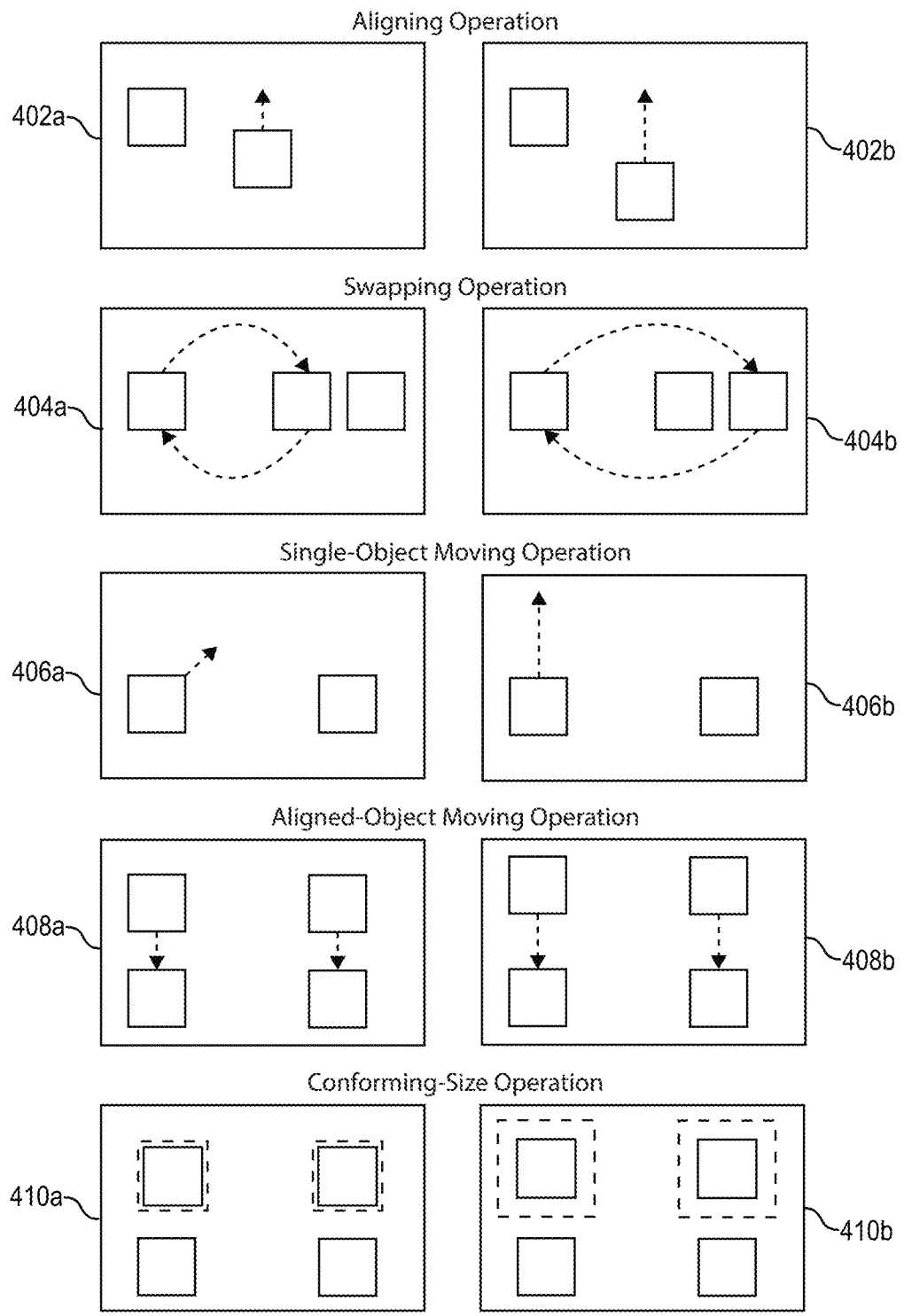
FIGS. 4A-4B illustrate operations for modifying digital objects within a digital design document in accordance with one or more embodiments.
Figure 4B:
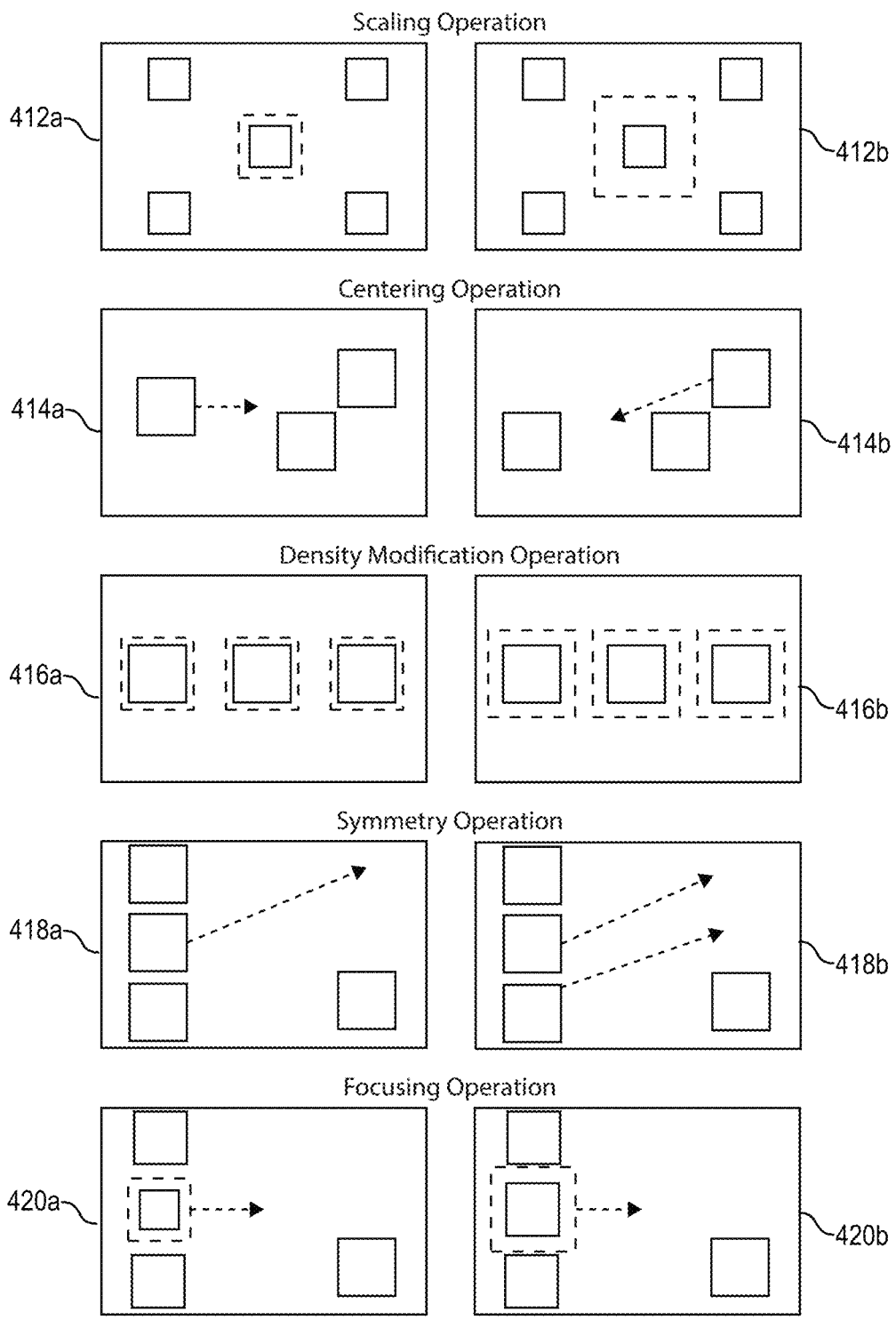

Turning now to FIGS. 4A-4B, as noted above, the digital design system 106 concurrently performs an operation from a variety of operations on digital objects. FIGS. 4A-4B illustrate examples of the digital design system 106 performing operations 402*a*-420*a* using a first operation magnitude. FIGS. 4A-4B also illustrate examples of the digital design system 106 performing operations 402*b*-420*b* using a second operation magnitude. In some embodiments, the digital design system 106 performs the operations 402*a*-420*a* in a first digital work group corresponding to a first entropy level and the operations 402*b*-420*b* in a second digital work group corresponding to a second entropy level.

In certain embodiments, the digital design system 106 performs an aligning operation that aligns digital objects within a layout. For example, the digital design system 106 may align edges of two digital objects along a vertical or horizontal line segment within a layout. As indicated by an arrow representing an aligning operation 402*a* in FIG. 4A, the digital design system 106 performs the aligning operation 402*a* using a first operation magnitude by moving one digital object to align with another digital object along an invisible horizontal line segment. As indicated by an arrow representing an aligning operation 402*b* in FIG. 4A, the digital design system 106 performs the aligning operation 402*b* by moving one digital object to align with another digital object along an invisible horizontal line segment. The distance between digital objects is smaller for the aligning operation 402*a* than for the aligning operation 402*b*.

Additionally, in certain embodiments, the digital design system 106 performs a swapping operation that exchanges positions of digital objects within a layout. For example, the digital design system 106 may exchange the positions of two digital objects within a layout in a diagonal, horizontal, vertical, or some other directional exchange. As indicated by counter-directional arrows representing a swapping operation 404*a* in FIG. 4A, the digital design system 106 performs the swapping operation 404*a* using a first operation magnitude by exchanging the position of one digital object with the position of another digital object. As indicated by counter-directional arrows representing a swapping operation 404*b* in FIG. 4A, the digital design system 106 performs the swapping operation 404*b* using a second operation magnitude by exchanging the position of one digital object with the position of yet another digital object. The distance between digital objects is smaller for the swapping operation 404*a* than for the swapping operation 404*b*.

Moreover, in certain implementations, the digital design system 106 performs a single-object moving operation that randomly moves a digital object within a layout. For example, the digital design system 106 may randomly move a digital object within a layout in a diagonal, horizontal, vertical, or some other direction. As indicated by an arrow representing a single-object moving operation 406*a* in FIG. 4A, the digital design system 106 performs the single-object moving operation 406*a* using a first operation magnitude by randomly moving a digital object in a direction within the layout. As indicated by another arrow representing a single-object moving operation 406*b*, the digital design system 106 and performs the single-object moving operation 406*b* using a second operation magnitude by randomly moving a digital object in another direction within the layout. The distance the digital object moves for the single-object moving operation 406*a* is shorter than for the single-object moving operation 406*b*.

In addition to a single-object moving operation, in some embodiments, the digital design system 106 performs an aligned-objects moving operation that moves aligned digital objects to different positions within a layout. For example, the digital design system 106 may move digital objects aligned along a diagonal, horizontal, vertical, or some other directional line segment to different positions within the layout. As indicated by a couple of arrows representing an aligned-objects moving operation 408*a* in FIG. 4A, the digital design system 106 performs the aligned-objects moving operation 408*a* using a first operation magnitude by moving digital objects with edges aligned along an invisible horizontal line segment to different positions within a layout. As indicated by another couple of arrows representing an aligned-objects moving operation 408*b* in FIG. 4A, the digital design system 106 performs the aligned-objects moving operation 408*b* using a second operation magnitude by moving digital objects with edges aligned along an invisible horizontal line segment to different positions within a layout. The distance the digital objects moves is shorter for the aligned-objects moving operation 408*a* than for the aligned-objects moving operation 408*b*.

In addition to an aligned-objects moving operation, in some embodiments, the digital design system 106 performs a conforming-size operation that scales digital objects to a same size. For example, the digital design system 106 may enlarge or shrink digital objects to a same size. As indicated by dotted-line boxes representing a conforming-size operation 410a in FIG. 4A, the digital design system 106 performs the conforming-size operation 410a using a first operation magnitude by enlarging digital objects to a same size. As indicated by dotted-line boxes representing a conforming-size operation 410b in FIG. 4A, the digital design system 106 performs the conforming-size operation 410b using a second operation magnitude by enlarging digital objects to a same size larger than the same size from the conforming-size operation 410a. The scale of enlargement of digital objects for the conforming-size operation 410b exceeds the scale of enlargement for the conforming-size operation 410a.

Turning back now to FIG. 4B, in addition to a conforming-size operation, in some embodiments, the digital design system 106 performs a scaling operation that adjusts a size of a digital object. For example, the digital design system 106 may enlarge or shrink a size of a digital object. As indicated by a dotted-line box representing a scaling operation 412a in FIG. 4B, the digital design system 106 performs the scaling operation 412a using a first operation magnitude by enlarging a size of a digital object. As indicated by a dotted-line box representing a scaling operation 412b in FIG. 4B, the digital design system 106 performs the scaling operation 412b using a second operation magnitude by enlarging a different size of a digital object. The scale of enlargement of the digital object for the scaling operation 412b exceeds the scale of enlargement for the scaling operation 412a.

In addition to a scaling operation, in some embodiments, the digital design system 106 performs a centering operation that moves a position of a digital object to a center position of a layout. For example, the digital design system 106 may move a digital object from a position from anywhere within a layout to a center position of the layout. As indicated by an arrow representing a centering operation 414a in FIG. 4B, the digital design system 106 performs the centering operation 414a using a first operation magnitude by moving a digital object from one position to a center position of a layout. As indicated by another arrow representing a centering operation 414b in FIG. 4B, the digital design system 106 performs the centering operation 414b using a second operation magnitude by moving a digital object a greater distance from one position to a center position of a layout. The moving distance to a center position for the centering operation 414b exceeds the moving distance for the centering operation 414a.

In addition to a centering operation, in some embodiments, the digital design system 106 performs a density-modification operation that modifies a size of each digital object to increase or decrease a density of a layout. For example, the digital design system 106 may enlarge or shrink a size of each digital object within a layout to increase or decrease a density of digital objects within the layout. As indicated by dotted-line boxes representing a density-modification operation 416a in FIG. 4B, the digital design system 106 performs the density-modification operation 416a using a first operation magnitude by enlarging sizes of digital objects within a layout. As indicated by dotted-line boxes representing a density-modification operation 416b in FIG. 4B, the digital design system 106 performs the density-modification operation 416b using a second operation magnitude by enlarging sizes of digital objects within a layout. The scale of enlargement of digital objects for the density-modification operation 416b exceeds the scale of enlargement for the density-modification operation 416a.

In addition to a density-modification operation, in some embodiments, the digital design system 106 performs a symmetry operation that moves one or more digital objects to a section of a layout. For example, the digital design system 106 may move one or more digital objects to a top section, bottom section, left section, right section of a layout or, similarly, top-left section, top-right section, bottom-left section, or bottom-right section of a layout. As indicated by an arrow representing a symmetry operation 418a in FIG. 4B, the digital design system 106 performs the symmetry operation 418a using a first operation magnitude by moving a digital object to a top-right section of a layout. As indicated by a couple of arrows representing a symmetry operation 418b in FIG. 4B, the digital design system 106 performs the symmetry operation 418b using a second operation magnitude by moving one digital object to a top-right section and another digital object to a middle-right section of a layout. The number of digital objects moved to a different section for the symmetry operation 418b exceeds the number of digital objects moved for the symmetry operation 418a.

In addition to a symmetry operation, in some embodiments, the digital design system 106 performs a focusing operation that increases a size of a digital object and moves the digital object toward a center position of a layout. For example, the digital design system 106 may increase a size of an image or logo and move the image or logo to a center position of a layout. As indicated by a dotted-line box and an arrow representing a focusing operation 420a in FIG. 4B, the digital design system 106 performs the focusing operation 420a using a first operation magnitude by increasing a size of a digital object and moving the digital object to a center position of a layout. As indicated by a dotted-line box and an arrow representing a focusing operation 420b in FIG. 4B, the digital design system 106 performs the focusing operation 420b using a second operation magnitude by increasing a size of a digital object—to a larger extent than for the focusing operation 420a—and/or moving the digital object to a greater degree toward the center position of a layout.

As indicated above, FIGS. 4A-4B illustrate the digital design system 106 performing operations at different operation magnitudes. For example, the difference in moving distance for digital objects shown in FIGS. 4A-4B indicates that the aligning operation 402a, the swapping operation 404a, the single-object moving operation 406a, the aligned-objects moving operation 408a, and the centering operation 414a correspond to a first (and lower) operation magnitude and that the aligning operation 402b, the swapping operation 404b, the single-object moving operation 406b, the aligned-objects moving operation 408b, and the centering operation 414b correspond to a second (and higher) operation magnitude. Additionally, the difference in enlargement of digital objects shown in FIGS. 4A-4B indicates the conforming-size operation 410a, the scaling operation 412a, the density-modification operation 416a, and focusing operation 420a correspond to a first (and lower) operation magnitude and that the conforming-size operation 410b, the scaling operation 412b, the density-modification operation 416b, and focusing operation 420b correspond to a second (and higher) operation magnitude. Finally, the difference in number of digital objects moved for the symmetry operations 418a and 418b—or the difference in location or distance moved for the symmetry operations 418a and 418b—indicates the symmetry operation 418a corresponds to a first (and lower) operation magnitude and that the symmetry operation 418b corresponds to a second (and higher) operation magnitude.

Figure 5A:
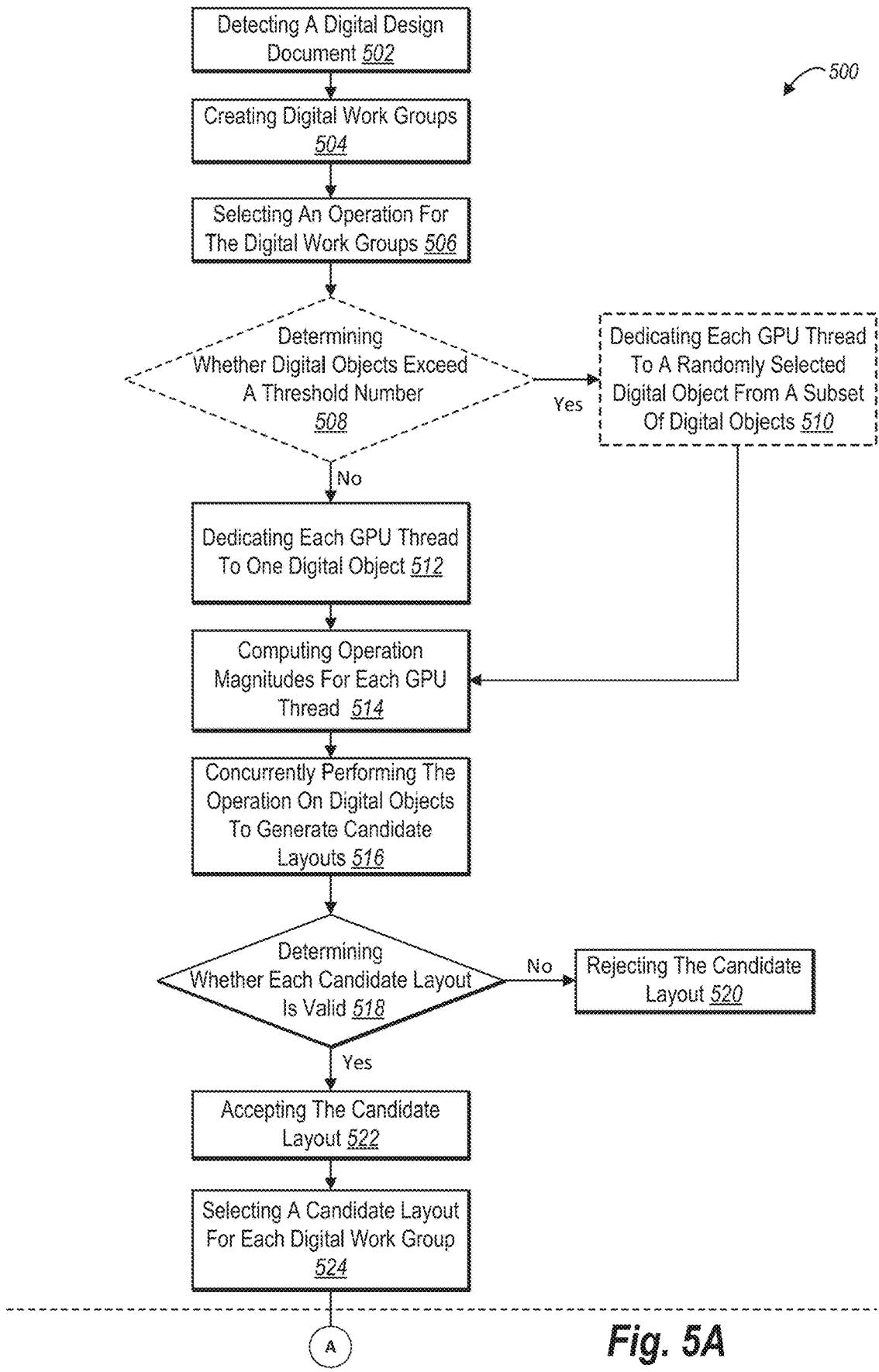
FIGS. 5A-5B illustrate a sequence-flow diagram of generating and evaluating candidate layouts for a digital design document by concurrently performing operations on digital objects within an initial layout in accordance with one or more embodiments.
Figure 5B:
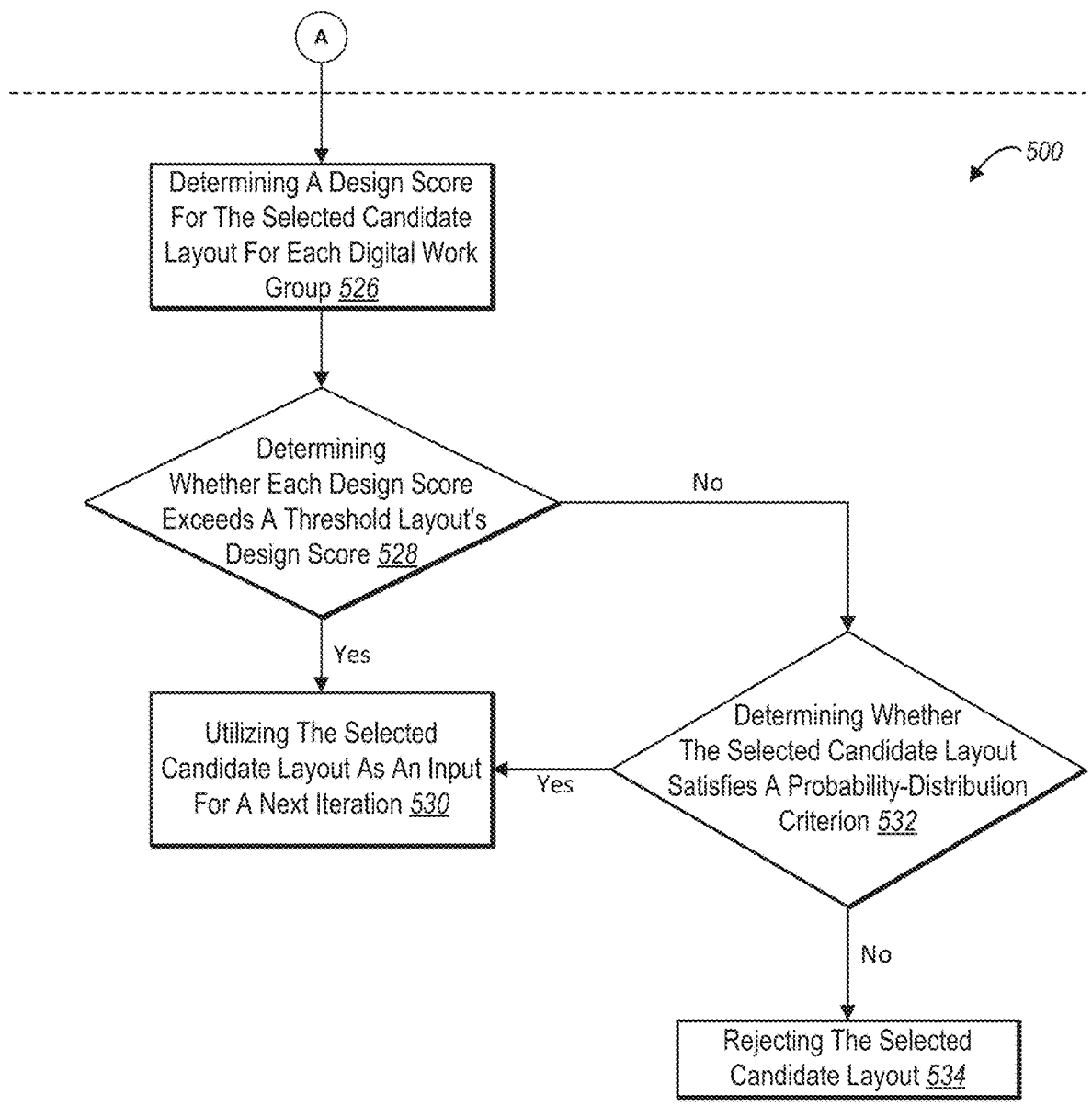

Turning now to FIGS. 5A-5B, these figures illustrate a sequence-flow diagram 500 of the digital design system 106 generating and evaluating candidate layouts for a digital design document by concurrently performing operations on digital objects within an initial layout. The sequence-flow diagram 500 includes a series of acts 502-534 that the digital design system 106 performs to generate modified layouts of digital objects based on the initial layout. The acts 502-534 correspond to acts performed by certain embodiments of the digital design system 106 described above.

As shown in FIG. 5A, the digital design system 106 performs the act 502 of detecting a digital design document having an initial layout of digital objects. As suggested above, in some embodiments, the digital design system 106 detects the digital design document and its initial layout in response to receiving an indication of a selection by a user of a layout-suggestion option. By contrast, in certain embodiments, the digital design system 106 detects the digital design document and its initial layout without receiving an indication of such a selection. Accordingly, the digital design system 106 can detect and begin analyzing a digital design document without user input requesting suggestions for alternative layouts.

After detecting the digital design document, the digital design system 106 performs the act 504 of creating digital work groups. Consistent with the disclosure above, in some embodiments, the digital design system 106 creates multiple digital work groups, where each digital work group corresponds to a different entropy level. In some such embodiments, the entropy levels increase in entropy (or variation of operation magnitude) for performing operations using the digital work groups. As noted above, the digital work groups may also include multiple GPU threads dedicated to performing operations on a digital object.

In addition to creating digital work groups, the digital design system 106 optionally performs the act 508 of determining whether digital objects exceed a threshold number. As noted above, in some embodiments, the digital design system 106 may use a digital work group or a GPU that includes a maximum number of GPU threads (e.g., a maximum of 32 CUDA threads). Depending on whether a digital work group or GPU thread includes such a constraint, the digital design system 106 may dedicate GPU thread to performing an operation on a digital object using different processes.

As further shown in FIG. 5A, in some such embodiments, if a digital design document includes a number of digital objects that exceed the threshold number, the digital design system 106 performs an act 510 of dedicating each GPU thread to a randomly selected digital object from a subset of digital objects. By contrast, in certain implementations, if a digital design document does not include a number of digital objects that exceed the threshold number, the digital design system dedicates each GPU thread to one of each digital object from the digital design document.

In any event, as shown in FIG. 5A, the digital design system 106 performs an act 512 of dedicating each GPU thread to one digital object from the digital design document. In certain embodiments, the digital design system 106 dedicates each GPU thread to one of each digital object from the digital design document. In certain embodiments, the digital design system 106 dedicates each GPU thread to a selected digital object from the digital design document.

Regardless of how and whether a GPU thread is dedicated, the digital design system 106 performs the act 514 of computing operation magnitudes for each GPU thread. For instance, the digital design system 106 may compute a different operation magnitude for each GPU thread within a digital work group (at each iteration) based on a normalized Gaussian distribution (or other probability distribution) corresponding to the particular digital work group's entropy level. By computing different operation magnitudes for each GPU thread, the digital design system 106 determines, for each iteration, operation magnitudes covering a spectrum of lower and higher operation magnitudes for performing operations using digital work groups corresponding to different entropy levels.

As further shown in FIG. 5A, in addition to creating digital work groups, the digital design system 106 performs the act 516 of concurrently performing the operation on digital objects to generate candidate layouts. As noted above, in some embodiments, the digital design system 106 randomly selects an operation (from a set of possible operations) to perform on digital objects for GPU threads within a digital work group. In certain embodiments, the digital design system 106 randomly selects different operations to perform on digital objects for GPU threads of different digital work groups. Regardless of whether the operation is randomly selected, the digital design system 106 uses different operation magnitudes to concurrently perform the operation on digital objects from the digital design document. As described above, in each digital work group, the operation modifies the digital object (or digital objects) to alter the initial layout. Based on performing the operation on multiple digital objects, the digital design system 106 generates candidate layouts of the digital objects.

After generating candidate layouts, the digital design system 106 performs the act 518 of determining whether each candidate layout is valid. As described above, for example, in some embodiments, the digital design system 106 measures overlap of digital objects within a candidate layout and/or measures containment of digital objects within a boundary of the candidate layout. Other validity criteria may also be used. Based on the overlap and/or containment, in some embodiments, the digital design system 106 determines whether the candidate layout is valid.

As shown in FIG. 5A, if a candidate layout is not valid, the digital design system 106 performs the act 520 of rejecting the candidate layout. Upon rejection, the digital design system 106 does not determine a design score for the candidate layout or further use the candidate layout. If a candidate layout is valid, however, the digital design system 106 performs the act 522 of accepting the candidate layout. By accepting the candidate layout, the digital design system 106 places the candidate layout among those candidate layouts that can be selected to receive a design score.

After accepting the candidate layout, the digital design system 106 performs the act 524 of selecting a candidate layout for each digital work group. As noted above, in some embodiments, the digital design system 106 uses random rotation and balloting to select a candidate layout to receive a design score for each digital work group. Alternatively, the digital design system 106 may use another method of random selection to select a candidate layout from among the valid candidate layouts for each digital work group.

As shown in FIG. 5B, after selecting a candidate layout for each digital work group, the digital design system 106 performs the act 526 of determining a design score for the selected candidate layout for each digital work group. Consistent with the disclosure above, the digital design system 106 determines a design score for each selected candidate layout based on one or more design metrics. In some embodiments, the digital design system 106 concurrently determines a design score for each selected candidate layout.

After determining a design score for each selected candidate layout, the digital design system 106 performs the act 528 of determining whether each design score exceeds a threshold layout's design score. In an initial iteration that uses an initial layout as an input, the digital design system 106 compares the design score for a selected candidate layout to an initial design score for the initial layout. Accordingly, in an initial iteration, the threshold layout is the initial layout. In subsequent iterations, the digital design system 106 compares the design score for a selected candidate layout to a design score for the candidate layout a digital work group used as an input. Accordingly, in subsequent iterations, the threshold layout is the candidate layout a given digital work group used as an input.

As further shown in FIG. 5B, if the design score for a selected candidate layout exceeds the threshold layout's design score, the digital design system 106 performs the act 530 of utilizing the selected candidate layout as an input for a next iteration. As described above, in iterations of some embodiments, the digital design system 106 may use the selected candidate layout as an input for the same digital work group that generated the selected candidate layout. In iterations of some embodiments, the digital design system 106 may exchange candidate layouts and use the selected candidate layout as an input for a different digital work group from the digital work group that generated the selected candidate layout.

By contrast, if the design score for a selected candidate layout falls below the threshold layout's design score, the digital design system 106 performs the act 532 of determining whether the selected candidate layout satisfies a probability-distribution criterion. Consistent with the disclosure above, in some embodiments, the digital design system 106 evaluates the selected candidate layout against a Metropolis-Hastings criterion.

As shown in FIG. 5B, if the selected candidate layout does not satisfy the probability-distribution criterion, the digital design system 106 performs the act 534 of rejecting the selected candidate layout. Upon rejection, the digital design system 106 does not use the selected candidate layout as an input or further use the selected candidate layout. But if the selected candidate layout satisfies the probability-distribution criterion, the digital design system 106 performs the act 530 of utilizing the selected candidate layout as an input for a next iteration.

Figure 6:
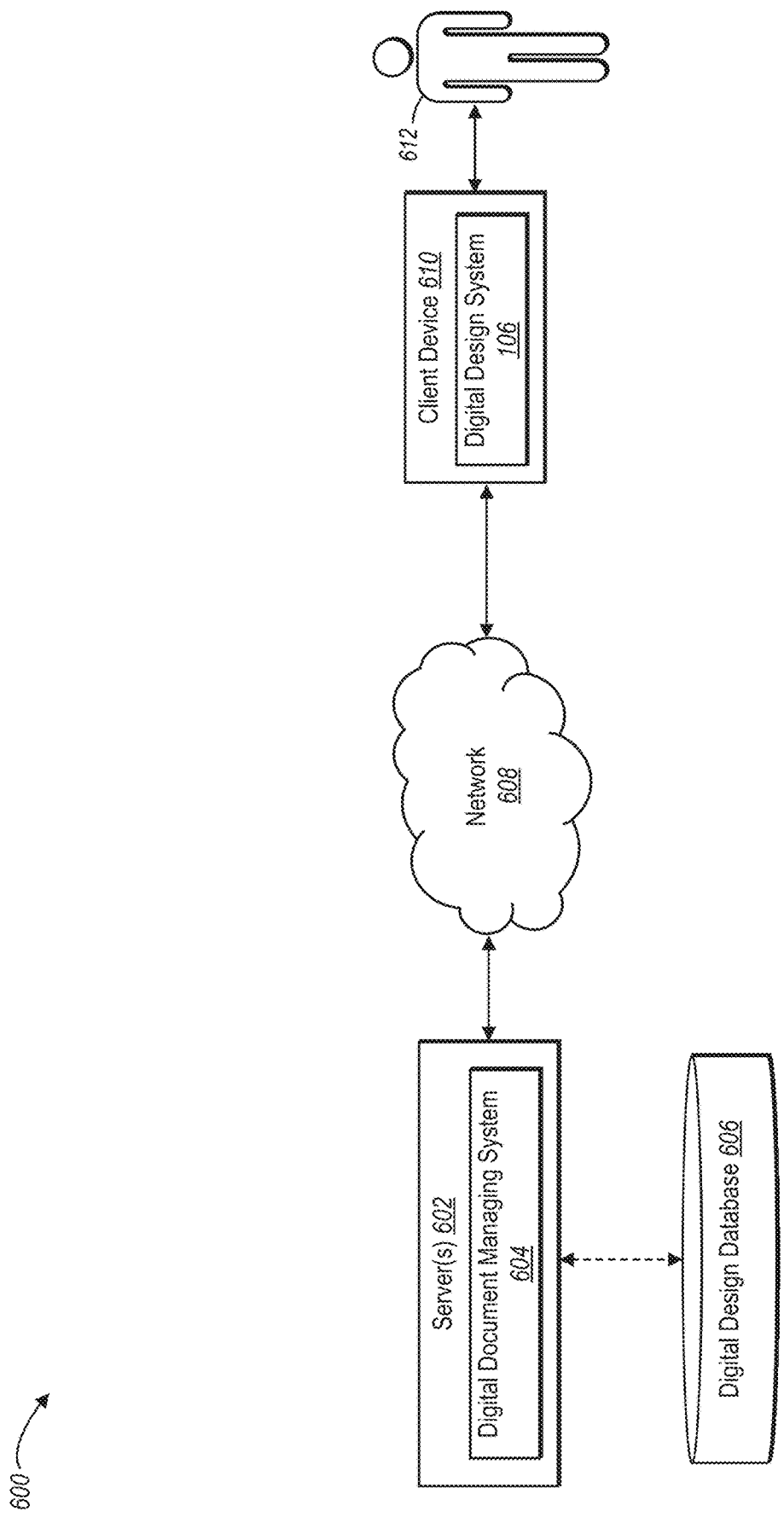
FIG. 6 illustrates a block diagram of an environment in which a digital document managing system and a digital design system can operate in accordance with one or more embodiments.
Figure 7:
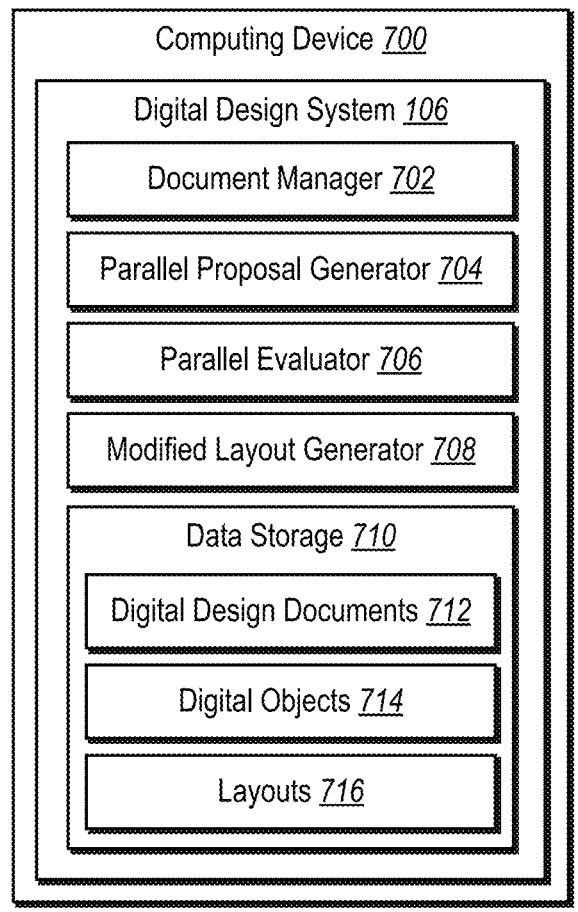
FIG. 7 illustrates a schematic diagram of the digital design system of FIG. 6 in accordance with one or more embodiments.

Turning now to FIGS. 6 and 7, these figures provide an overview of an environment in which a digital design system can operate and an example of an architecture for the digital design system. FIG. 6 is a block diagram illustrating an environment 600 in which a digital design system 106 can operate in accordance with one or more embodiments. As illustrated in FIG. 6, the environment 600 includes server(s) 602; a client device 610; a user 612; and a network 608, such as the Internet. The server(s) 602 include a digital document managing system 604, and the client device includes the digital design system 106. As shown in FIG. 6, the digital document managing system 604 comprises computer executable instructions that, when executed by a processor of the server(s) 602, perform actions related to the digital design system 106, such as identifying digital design documents or digital objects for download. Additionally, as shown in FIG. 6, the digital design system 106 comprises computer executable instructions that, when executed by a processor of the client device 610, performs certain actions described above with reference to FIGS. 1-5B.

Although FIG. 6 illustrates an arrangement of the server(s) 602, the client device 610, and the network 608, various additional arrangements are possible. For example, the client device 610 may directly communicate with the server(s) 602 and thereby bypass the network 608. Alternatively, in certain embodiments, the server(s) 602 include and execute computer-executable instructions that comprise the digital design system 106. For explanatory purposes, however, the disclosure in relation to FIG. 6 describes the client device 610 as including and executing the digital design system 106.

As further illustrated in FIG. 6, the client device 610 communicates through the network 608 with the digital document managing system 604 via the server(s) 602. Accordingly, the user 612 can access one or more digital design documents or software applications provided (in whole or in part) by the digital document managing system 604, including to download data packets encoding for the digital design system 106. Additionally, in some embodiments, third-party network server(s) (not shown) provide data to the client device 610 that enable the digital design system 106 to access, download, or upload digital design documents via the client device 610. While FIG. 6 illustrates one client device 610 and one user 612, in alternative embodiments, the environment 600 includes more than the client device 610 and the user 612. For example, in other embodiments, the environment 600 includes hundreds, thousands, millions, or billions of users and corresponding client devices.

As also shown in FIG. 6, in some embodiments, the digital design system 106 accesses, manages, analyzes, and queries data corresponding to a digital design document, including digital objects within a digital design document. For example, the digital design system 106 accesses and analyzes digital design documents that are stored within the digital design database 606. In some such embodiments, upon accessing a digital design document, the digital design system 106 determines an initial layout of digital objects for the digital design document (e.g., utilizing the GPU of the client device 610).

In one or more embodiments, the client device 610 transmits data corresponding to a digital design document through the network 608 to the digital document managing system 604, such as when downloading digital design documents or software applications or uploading digital design documents. To generate the transmitted data or initiate communications, the user 612 interacts with the client device 610. The client device 610 may include, but is not limited to, mobile devices (e.g., smartphones, tablets), laptops, desktops, or any other type of computing device, such as those described below in relation to FIG. 9. Similarly, the network 608 may comprise any of the networks described below in relation to FIG. 9.

As noted above, the digital design system 106 may include instructions that cause the client device 610 to perform actions for the digital design system 106 described above. For example, in some embodiments, the client device 610 detects a selection by the user 612 of a layout-suggestion option. After detecting the selection, the client device 610 uses a graphical processing unit to execute instructions from the digital design system 106 to create digital work groups of differing entropy levels (and corresponding GPU threads), concurrently perform operations on digital objects to generate candidate layouts, and concurrently evaluate the candidate layouts to select and provide one or more modified layouts.

As also illustrated in FIG. 6, the digital document managing system 604 is communicatively coupled to a digital design database 606. In one or more embodiments, the digital document managing system 604 accesses and queries data from the digital design database 606 associated with requests from the digital design system 106. For instance, the digital document managing system 604 may access templates for digital design documents for the digital design system 106 or updated computer-executable instructions for the digital design system 106. As shown in FIG. 6, the digital design database 606 is separately maintained from the server(s) 602. Alternatively, in one or more embodiments, the digital document managing system 604 and the digital design database 606 comprise a single combined system or subsystem within the server(s) 602

Turning now to FIG. 7, additional detail is provided regarding components and features of the digital design system 106. In particular, FIG. 7 shows a computing device 700 implementing the digital design system 106. In some embodiments, the computing device 700 comprises one or more servers (e.g., the server(s) 602) that support the digital design system 106. In other embodiments, the computing device 700 is the client device 610. As the computing device 700 suggests, in some embodiments, the server(s) 602 comprise the digital design system 106 or portions of the digital design system 106. In particular, in some instances, the server(s) 602 use the digital design system 106 to perform some or all of the functions described above with reference to FIGS. 1-5B.

As shown in FIG. 7, the computing device 700 includes the digital design system 106. The digital design system 106 in turn includes, but is not limited to, a document manager 702, a parallel proposal generator 704, a parallel evaluator 706, a modified layout generator 708, and a data storage 710.

As shown in FIG. 7, the document manager 702 detects and analyzes digital design documents. For example, the document manager 702 detects an initial layout of digital objects within a digital design document. The document manager 702 may detect an initial layout automatically or in response to receiving an indication of a selection of a layout-suggestion option.

As further shown in FIG. 7, the parallel proposal generator 704 concurrently performs operations on digital objects using different operation magnitudes (based on different entropy levels) and generates candidate layouts of those digital objects. For instance, in some embodiments, the parallel proposal generator 704 is an example implementation of the parallel proposal generator 108 depicted in FIG. 1. In certain embodiments, the parallel proposal generator 704 creates digital work groups and GPU threads, computes an operation magnitude for each GPU thread based on a corresponding digital work group's entropy level, and/or dedicates GPU threads to performing operations on one of the digital objects. As suggested above, in some implementations, the parallel proposal generator 704 sends a call to a graphics processing unit to concurrently perform operations on digital objects and generate candidate layouts of those digital objects.

In addition to generating candidate layouts, the digital design system 106 also evaluates the candidate layouts using the parallel evaluator 706 (e.g., an exemplary implementation of the parallel evaluator 110 depicted in FIG. 1). As shown in FIG. 7, the parallel evaluator 706 determines the validity of candidate layouts, selects candidate layouts to receive a design score, and determines a design score for the selected candidate layouts. Consistent with the disclosure above, in some embodiments, the parallel evaluator 706 concurrently determines design scores for selected candidate layouts.

After determining design scores, in certain embodiments, the parallel evaluator 706 compares each design score for a candidate layout to a threshold layout's design score. Consistent with the disclosure above, in some embodiments, the threshold layout is an initial layout or a candidate layout that a given digital work group used as an input. In addition to determining and comparing design scores, in one or more embodiments, the parallel evaluator 706 compares or evaluates some or all candidate layouts against a probability-distribution criterion. Based on a design score and/or a probability-distribution criterion, the parallel evaluator 706 determines which candidate layout to use as an input for a digital work group's next iteration.

Additionally, as shown in FIG. 7, the modified layout generator 708 generates modified layouts for presentation to a user. Consistent with the disclosure above, the modified layout generator 708 compares the design scores of selected candidate layouts (from multiple iterations) and identifies one or more of the selected candidate layouts as modified layouts for presentation to a user. In some such embodiments, the modified layout generator 708 identifies a candidate layout (or multiple candidate layouts) corresponding to a highest design score (or a certain number of highest design scores) as the modified layout. As noted above, in some embodiments, the modified layout generator 708 generates digital design thumbnails and/or digital design documents having the modified layouts.

As also shown in FIG. 7, the digital design system 106 includes the data storage 712. The data storage 712 maintains digital design documents 714, digital objects 716, and/or layouts 718. In one or more embodiments, the digital design documents 714 comprise data files for digital design documents accessible to or created by the user 112. Moreover, in some embodiments, the digital objects 716 include data files for digital objects that can be inserted in to (or modified within) digital design documents. Additionally, in some embodiments, the layouts 718 include data files for candidate layouts or modified layouts generated by the digital design system 106.

Figure 8:
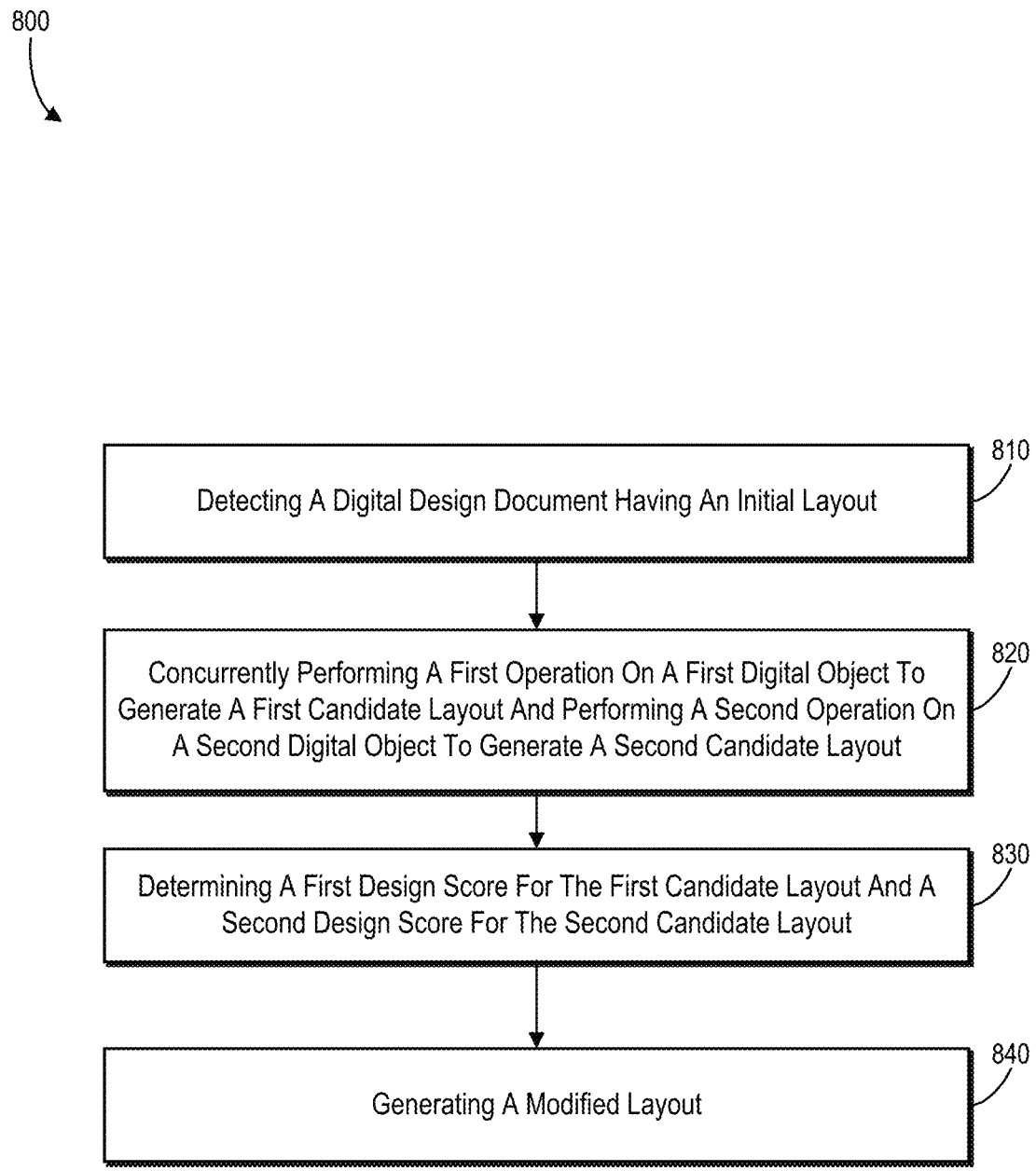
FIG. 8 illustrates a flowchart of a series of acts for generating candidate layouts for a digital design document by concurrently performing operations on digital objects within an initial layout in accordance with one or more embodiments.

Turning now to FIG. 8, this figure illustrates a flowchart of a series of acts 800 of generating candidate layouts for a digital design document by concurrently performing operations on digital objects within an initial layout in accordance with one or more embodiments. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer readable storage medium can comprise instructions that, when executed by one or more processors, cause a computing device to perform the acts depicted in FIG. 8. In still further embodiments, a system can perform the acts of FIG. 8.

As shown in FIG. 8, the acts 800 include an act 810 of detecting a digital design document having an initial layout. For example, in some embodiments, the act 810 includes detecting a digital design document having an initial layout of a plurality of digital objects.

As further shown in FIG. 8, the acts 800 include an act 820 of concurrently performing a first operation on a first digital object to generate a first candidate layout and performing a second operation on a second digital object to generate a second candidate layout. For example, in certain embodiments, the act 820 includes utilizing a graphics processing unit to concurrently perform a first operation on a first digital object of the plurality of digital objects using a first operation magnitude to generate a first candidate layout of the plurality of digital objects and perform a second operation on a second digital object using a second operation magnitude to generate a second candidate layout of the plurality of digital objects. In some such embodiments, the first digital object and the second digital object comprise a same digital object of the plurality of digital objects.

As suggested above, in one or more embodiments, concurrently performing the first operation on the first digital object to generate the first candidate layout and performing the second operation on the second digital object to generate the second candidate layout comprises creating a first digital work group corresponding to a first entropy level comprising, for each of the plurality of digital objects, a corresponding graphics-processing-unit thread dedicated to performing operations on the digital object; determining the first operation magnitude based on the first entropy level corresponding to the first digital work group; creating a second digital work group corresponding to a second entropy level comprising, for each of the plurality of digital objects, an additional corresponding graphics-processing-unit thread dedicated to performing operations on the digital object; and determining the second operation magnitude based on the second entropy level corresponding to the second digital work group.

For example, in certain embodiments, creating the first digital work group and the second digital work group comprises creating the first digital work group comprising a first graphics-processing-unit thread that uses the initial layout as an input, the first graphics-processing-unit thread dedicated to performing operations on the first digital object based on the first entropy level; and creating the second digital work group comprising a second graphics-processing-unit thread that uses the initial layout as an additional input, the second graphics-processing-unit thread dedicated to performing operations on the second digital object based on the second entropy level.

Relatedly, in some implementations, generating the first candidate layout and the second candidate layout comprises concurrently performing the first operation on the first digital object within the first graphics-processing-unit thread to modify the first digital object within the initial layout according to the first operation magnitude; and performing the second operation on the second digital object within the second graphics-processing-unit thread to modify the second digital object within the initial layout according to the second operation magnitude.

Additionally, in certain embodiments, creating the first digital work group and the second digital work group comprises creating the first digital work group comprising, for each of the plurality of digital objects, a corresponding graphics-processing-unit thread dedicated to performing operations on the digital object; and creating the second digital work group comprising, for each of the plurality of digital objects, an additional corresponding graphics-processing-unit thread dedicated to performing operations on the digital object.

Relatedly, in some implementations, generating the first candidate layout and the second candidate layout comprises concurrently: for each corresponding graphics-processing-unit thread, performing the first operation on the digital object corresponding to the graphics-processing-unit thread using the first operation magnitude; and for each additional corresponding graphics-processing-unit thread, performing the second operation on the digital object corresponding to the additional graphics-processing-unit thread using the second operation magnitude.

In certain embodiments, the first operation or second operation comprises one of: an aligning operation for aligning digital objects of the plurality of digital objects; a swapping operation for exchanging positions of the digital objects; a single-object moving operation for randomly moving a digital object of the plurality of digital objects; an aligned-objects moving operation for moving aligned digital objects of the plurality of digital objects; a conforming-size operation for scaling the digital objects to a same size; a scaling operation for adjusting a size of the digital object; a centering operation for moving a position of the digital object to a center position of a layout of the plurality of digital objects; a density-modification operation for modifying a size of each of the plurality of digital objects to increase or decrease a density of the layout; a symmetry operation for moving one or more digital objects of the plurality of digital objects to a section of the layout; or a focusing operation for increasing a size of the digital object and moving the digital object toward a center position of the layout.

As further shown in FIG. 8, the acts 800 include an act 830 of determining a first design score for the first candidate layout and a second design score for the second candidate layout. For example, in certain implementations, the act 830 includes determining a first design score for the first candidate layout based on design metrics of the first candidate layout and a second design score for the second candidate layout based on design metrics of the second candidate layout. In some such embodiments, the first candidate layout comprises a modified first digital object according to the first operation magnitude and the second candidate layout comprises a modified second digital object according to the second operation magnitude.

Indeed, in one or more embodiments, the act 830 includes determining the first design score for the first candidate layout and the second design score for the second candidate layout by utilizing a graphics processing unit to concurrently: determine design metrics for the first candidate layout and design metrics for the second candidate layout; and generate the first design score based on the design metrics for the first candidate layout and generate the second design score based on the design metrics for the second candidate layout. In certain embodiments, determining the first design score for the first candidate layout and the second design score for the second candidate layout comprises generating a single call to a graphics processing unit to concurrently determine the first design score for the first candidate layout and the second design score for the second candidate layout.

Additionally, in some embodiments, the design metrics of the first candidate layout and the design metrics of the second candidate layout each comprise one or more of: an alignment-points metric representing a level of alignment points for the plurality of digital objects within a layout of the plurality of digital objects; a uniform-separation metric representing a determination of separation values among the plurality of digital objects within the layout; a size-economy metric representing a level of different sizes among the plurality of digital objects within the layout; a layout-density metric representing a portion of the layout comprising the plurality of digital objects; a layout-symmetry metric representing a level of symmetry among the plurality of digital objects based on one or more axes of the layout; a balance metric representing a distribution of optical weight among the plurality of digital objects in the layout; a simplicity metric representing a ratio of a number of digital objects and alignment points of the plurality of digital objects within the layout; a layout-unity metric representing a coherence of the plurality of digital objects; a layout-regularity metric representing a consistency of spacing among the plurality of digital objects within the layout; or a focal-object metric representing a ratio of a size of a focal digital object of the plurality of digital objects to an additional size of an additional largest digital object of the plurality of digital objects.

As further shown in FIG. 8, the acts 800 include an act 840 of generating a modified layout. For example, in some embodiments, the act 840 includes generating a modified layout of the plurality of digital objects based on a comparison of the first design score and the second design score.

In addition to the acts 810-840, in some embodiments, the acts 800 further include modifying the first graphics-processing-unit thread to use the first candidate layout as an input for performing operations; and modifying the second graphics-processing-unit thread to use the second candidate layout as an additional input for performing operations. By contrast, in some embodiments, the acts 800 further include modifying the first graphics-processing-unit thread to use the second candidate layout as an input for performing operations; and modifying the second graphics-processing-unit thread to use the first candidate layout as an additional input for performing operations.

Additionally, in certain embodiments, the acts 800 further include generating a third candidate layout of the plurality of digital objects and a fourth candidate layout of the plurality of digital objects by concurrently: performing a randomly selected operation on the first digital object within the first graphics-processing-unit thread using a third operation magnitude based on the first entropy level; and performing an additional randomly selected operation on the second digital object within the second graphics-processing-unit thread using a fourth operation magnitude based on the second entropy level; and determining a third design score for the third candidate layout based on design metrics of the third candidate layout and a fourth design score for the fourth candidate layout based on design metrics of the fourth candidate layout. In some such embodiments, generating the modified layout of the plurality of digital objects comprises selecting a layout corresponding to a highest design score from among the first candidate layout, the second candidate layout, the third candidate layout, and the fourth candidate layout. Similarly, in some embodiments, generating the modified layout of the plurality of digital objects comprises selecting at least one of the first candidate layout and the second candidate as the modified layout based on the first design score and the second design score.

As noted above, in some embodiments, a digital design system selects a candidate layout based on design score and/or a probability-distribution criterion. In certain implementations, the acts 800 further include determining an initial design score for the initial layout based on design metrics of the initial layout; determining that the first design score exceeds the initial design score; and selecting the first candidate layout as an input layout for each corresponding graphics-processing-unit thread of the first digital work group based on determining that the first design score exceeds the initial design score.

Relatedly, in certain implementations, the acts 800 further include determining that the second design score falls below the initial design score; evaluating the second candidate layout against a probability-distribution criterion based on determining that the second design score falls below the initial design score; and based on determining that the second design score satisfies the probability-distribution criterion, selecting the second candidate layout as an input layout for each additional corresponding graphics-processing-unit thread of the second digital work group.

Additionally, in some embodiments, the acts 800 further include utilizing the graphics processing unit to perform the first operation on the first digital object by concurrently: performing the first operation on the first digital object using the first operation magnitude based on the first entropy level corresponding to the first digital work group to generate the first candidate layout; and performing the first operation on a third digital object of the plurality of digital objects using a third operation magnitude based on the first entropy level corresponding to the first digital work group to generate a third candidate layout of the plurality of objects. In some such embodiments, the acts 800 further include utilizing the graphics processing unit to perform the second operation on the second digital object by concurrently: performing the second operation on the second digital object using the second operation magnitude based on the second entropy level corresponding to the second digital work group to generate the second candidate layout; and performing the second operation on a fourth digital object of the plurality of digital objects using the second operation magnitude based on the second entropy level corresponding to the second digital work group to generate a fourth candidate layout of the plurality of objects.

Relatedly, in certain embodiments, the acts 800 further include selecting the first candidate layout, from between the first candidate layout and the third candidate layout, as a selected candidate layout for the first digital work group to receive a design score based on random rotation and balloting. In some such embodiments, the acts 800 further include selecting the second candidate layout, from between the second candidate layout and the fourth candidate layout, as a selected candidate layout for the second digital work group to receive a design score based on random rotation and balloting.

Moreover, in some embodiments, the acts 800 further include determining that the first candidate layout is valid based on a first measure of overlap of the plurality of digital objects within the first candidate layout; and based on determining that the first candidate layout is valid, determining the first design score for the first candidate layout.

Additionally, in some embodiments, the acts 800 further include generating the first operation magnitude based on the first entropy level utilizing a normalized Gaussian distribution corresponding to the first entropy level. Similarly, in certain implementations, the acts 800 further include generating the second operation magnitude based on the second entropy level utilizing a normalized Gaussian distribution corresponding to the second entropy level.

In addition to the acts describe above, in some embodiments the acts 800 include a step for generating a first candidate layout of the plurality of digital objects and a second candidate layout of the plurality of digital objects. The acts 504, 506, 512, 514, and 516 from FIG. 5A comprise an algorithm and correspond to the step for generating a first candidate layout of the plurality of digital objects and a second candidate layout of the plurality of digital objects. Accordingly, the description and embodiments set forth above for the acts 504, 506, 512, 514, and 516 correspond to the step for generating a first candidate layout of the plurality of digital objects and a second candidate layout of the plurality of digital objects.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing subscription model can be composed of various characteristics such as, for example, on-demand self-service, broad network access, resource pooling, rapid elasticity, measured service, and so forth. A cloud-computing subscription model can also expose various service subscription models, such as, for example, Software as a Service ("SaaS"), a web service, Platform as a Service ("PaaS"), and Infrastructure as a Service ("IaaS"). A cloud-computing subscription model can also be deployed using different deployment subscription models such as private cloud, community cloud, public cloud, hybrid cloud, and so forth. In this description and in the claims, a "cloud-computing environment" is an environment in which cloud computing is employed.

Figure 9:
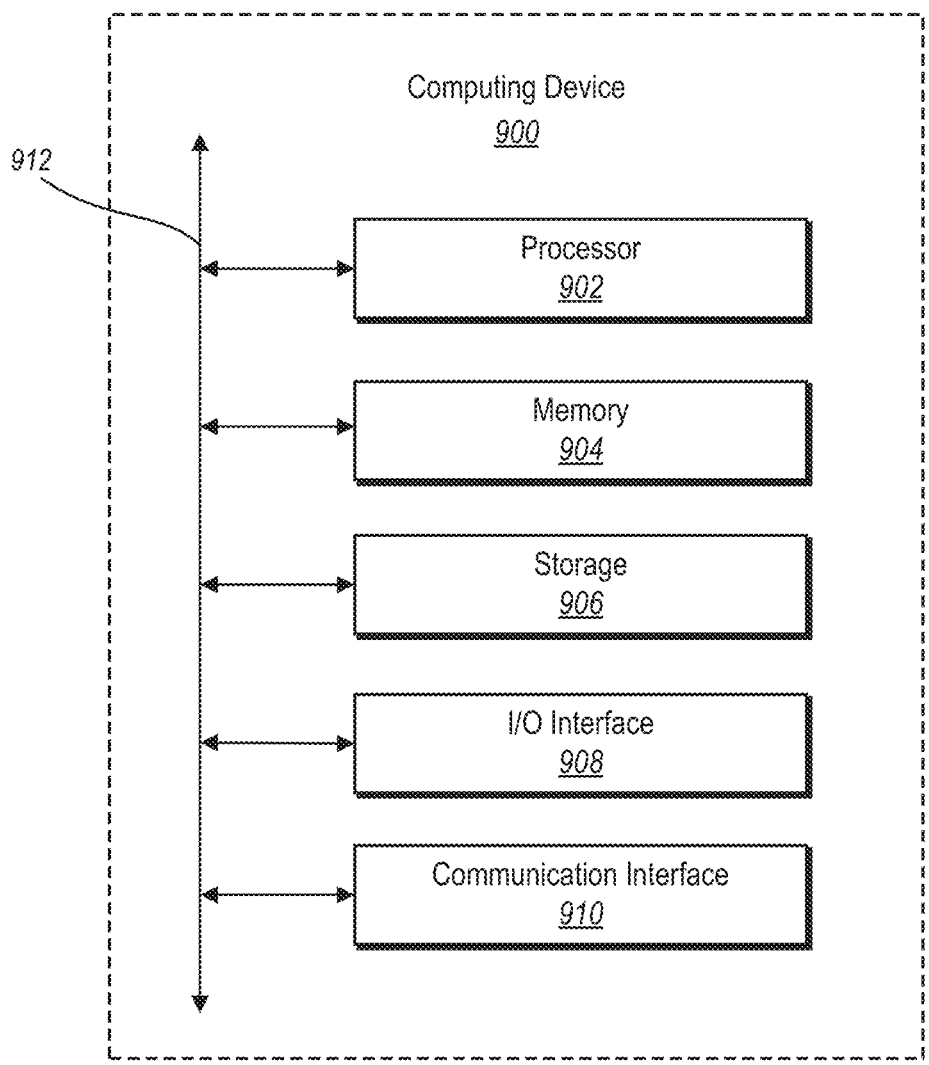
FIG. 9 illustrates a block diagram of an exemplary computing device for implementing one or more embodiments of the present disclosure.

FIG. 9 illustrates a block diagram of exemplary computing device 900 that may be configured to perform one or more of the processes described above. As shown by FIG. 9, the computing device 900 can comprise a processor 902, a memory 904, a storage device 906, an I/O interface 908, and a communication interface 910, which may be communicatively coupled by way of a communication infrastructure 912. In certain embodiments, the computing device 900 can include fewer or more components than those shown in FIG. 9. Components of the computing device 900 shown in FIG. 9 will now be described in additional detail.

In one or more embodiments, the processor 902 includes hardware for executing instructions, such as those making up a computer program. As an example, and not by way of limitation, to execute instructions for digitizing real-world objects, the processor 902 may retrieve (or fetch) the instructions from an internal register, an internal cache, the memory 904, or the storage device 906 and decode and execute them. The memory 904 may be a volatile or non-volatile memory used for storing data, metadata, and programs for execution by the processor(s). The storage device 906 includes storage, such as a hard disk, flash disk drive, or other digital storage device, for storing data or instructions related to object digitizing processes (e.g., digital scans, digital models).

The I/O interface 908 allows a user to provide input to, receive output from, and otherwise transfer data to and receive data from computing device 900. The I/O interface 908 may include a mouse, a keypad or a keyboard, a touch screen, a camera, an optical scanner, network interface, modem, other known I/O devices or a combination of such I/O interfaces. The I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 908 is configured to provide graphical data to a display for presentation to a user. The graphical data may be representative of one or more graphical user interfaces and/or any other graphical content as may serve a particular implementation.

The communication interface 910 can include hardware, software, or both. In any event, the communication interface 910 can provide one or more interfaces for communication (such as, for example, packet-based communication) between the computing device 900 and one or more other computing devices or networks. As an example and not by way of limitation, the communication interface 910 may include a network interface controller ("NIC") or network adapter for communicating with an Ethernet or other wire-based network or a wireless NIC ("WNIC") or wireless adapter for communicating with a wireless network, such as a WI-FI.

Additionally, the communication interface 910 may facilitate communications with various types of wired or wireless networks. The communication interface 910 may also facilitate communications using various communication protocols. The communication infrastructure 912 may also include hardware, software, or both that couples components of the computing device 900 to each other. For example, the communication interface 910 may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected workflow and image data for a plurality of images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

We claim:

1. A system for generating layouts for digital design documents comprising:
one or more memory devices; and
one or more processors configured to cause the system to:
detect a digital design document having an initial layout of a plurality of digital objects;
create, for a first entropy level, a first digital work group comprising, for each of the plurality of digital objects, a first graphics-processing-unit thread;
create, for a second entropy level differing from the first entropy level, a second digital work group comprising, for each of the plurality of digital objects, a second graphics-processing-unit thread;
select a first operation for the first digital work group and a second operation for the second digital work group, the first operation differing from the second operation;
dedicate the first graphics-processing-unit thread to a first digital object of the plurality of digital objects and the second graphics-processing-unit thread to a second digital object of the plurality of digital objects, the second digital object differing from the first digital object;
compute, for the first graphics-processing-unit thread, a first operation magnitude for modifying digital objects from a-the first entropy level and, for the second graphics-processing-unit thread, a second operation magnitude for modifying digital objects from the second entropy level;
utilize a graphics processing unit to perform concurrent operations of different operation magnitudes on digital objects of the plurality of digital objects by concurrently:
performing, utilizing the first digital work group and the first graphics-processing-unit thread, the first operation at the first operation magnitude on the first digital object of the plurality of digital objects to generate a first candidate layout of the plurality of digital objects; and
performing, utilizing the second digital work group and the second graphics-processing-unit thread, the second operation at the second operation magnitude on the second digital object to generate a second candidate layout of the plurality of digital objects;

determine a first design score for the first candidate layout and a second design score for the second candidate layout; and generate a modified layout of the plurality of digital objects based on a comparison of the first design score and the second design score.

2. The system of claim 1, wherein the one or more processors are further configured to cause the system to determine the first design score for the first candidate layout and the second design score for the second candidate layout by utilizing the graphics processing unit to:

concurrently determine design metrics for the first candidate layout and design metrics for the second candidate layout; and concurrently generate the first design score based on the design metrics for the first candidate layout and generate the second design score based on the design metrics for the second candidate layout.

3. The system of claim 2, wherein the one or more processors are further configured to cause the system to:

determine an initial design score for the initial layout based on design metrics of the initial layout;

determine that the second design score falls below the initial design score;

evaluate the second candidate layout against a probability-distribution criterion based on determining that the second design score falls below the initial design score; and based on determining that the second design score satisfies the probability-distribution criterion, select the second candidate layout as an input layout for each additional corresponding graphics-processing-unit thread of the second digital work group.

4. The system of claim 1, wherein:

the first entropy level is a measure of variation comprising a range, deviation, or spread of operational magnitudes;

the first entropy level comprises a lower range of operation magnitudes than the second entropy level; and an operational magnitude comprises a degree to which an operation to a digital object is performed.

5. The system of claim 1, wherein the one or more processors are further configured to cause the system to utilize the graphics processing unit to perform the first operation on the first digital object by concurrently:

performing the first operation at the first operation magnitude from the first entropy level on the first digital object to generate the first candidate layout; and performing the first operation at a third operation magnitude from the first entropy level on a third digital object of the plurality of digital objects to generate a third candidate layout of the plurality of digital objects.

6. The system of claim 1, wherein the one or more processors are further configured to cause the system to determine the first design score for the first candidate layout in part by:

determining a layout-symmetry metric representing a level of symmetry among the plurality of digital objects within the first candidate layout; and determining a balance metric representing a distribution of optical weight among the plurality of digital objects within the first candidate layout.

7. The system of claim 1, wherein the one or more processors are further configured to cause the system to compute the first operation magnitude from the first entropy level utilizing a normalized Gaussian distribution of operation magnitudes for digital-object operations from the first entropy level.

8. The system of claim 1, wherein the first operation or the second operation comprises one of:

a swapping operation for exchanging positions of digital objects of the plurality of digital objects;

a conforming-size operation for scaling the digital objects to a same size;

a scaling operation for adjusting a size of a digital object of the plurality of digital objects; or a focusing operation for increasing a size of the digital object and moving the digital object toward a center position of a layout.

9. The system of claim 1, wherein the one or more processors are further configured to cause the system to:

generate a third candidate layout of the plurality of digital objects;

determine that the third candidate layout is invalid based on a measure of overlap of the plurality of digital objects within the third candidate layout; and reject the third candidate layout as a candidate layout based on determining that the third candidate layout is invalid.

10. A non-transitory computer readable storage medium storing executable instructions that, when executed by a processing device, cause the processing device to:

detect a digital design document having an initial layout of a plurality of digital objects;

create, for a first entropy level, a first digital work group comprising, for each of the plurality of digital objects, a first graphics-processing-unit thread;

create, for a second entropy level, a second digital work group comprising, for each of the plurality of digital objects, a second graphics-processing-unit thread;

select a first operation for the first digital work group and a second operation for the second digital work group;

dedicate the first graphics-processing-unit thread to a first digital object of the plurality of digital objects and the second graphics-processing-unit thread to a second digital object of the plurality of digital objects, the second digital object differing from the first digital object compute, for the first digital work group, a first operation magnitude for modifying digital objects from the first entropy level, the first entropy level comprising a first range of operation magnitudes;

determine, for a second digital work group, a second operation magnitude for modifying digital objects from the second entropy level, the second entropy level comprising a second range of operation magnitudes differing from the first range of operation magnitudes;

generate a first candidate layout of the plurality of digital objects and a second candidate layout of the plurality of digital objects by performing concurrent operations of different operation magnitudes on digital objects of the plurality of digital objects, including:

performing, utilizing the first digital work group for the first entropy level and the first graphics-processing-unit thread, the first operation at the first operation magnitude on the first digital object; and performing, utilizing the second digital work group for the second entropy level and the second graphics-processing-unit thread, a second operation at the second operation magnitude on the second digital object;

determine a first design score for the first candidate layout and a second design score for the second candidate layout; and generate a modified layout of the plurality of digital objects based on the first design score and the second design score.

11. The non-transitory computer readable storage medium of claim 10, further storing executable instructions that, when executed by the processing device, cause the processing device to determine the first design score for the first candidate layout and the second design score for the second candidate layout utilizing a graphics processing unit to:
concurrently determine design metrics for the first candidate layout and design metrics for the second candidate layout; and
concurrently generate the first design score based on the design metrics for the first candidate layout and generate the second design score based on the design metrics for the second candidate layout.

12. The non-transitory computer readable storage medium of claim 10, further storing executable instructions that, when executed by the processing device, cause the processing device to compute the first operation magnitude from the first entropy level utilizing a normalized Gaussian distribution of operation magnitudes for digital-object operations from the first entropy level.

13. The non-transitory computer readable storage medium of claim 10, wherein:
the first graphics-processing-unit thread uses the initial layout as an input; and
the second graphics-processing-unit thread uses the initial layout as an additional input.

14. The non-transitory computer readable storage medium of claim 10, further storing executable instructions that, when executed by the processing device, cause the processing device to determine the first design score for the first candidate layout in part by:
determining a layout-symmetry metric representing a level of symmetry among the plurality of digital objects within the first candidate layout; and
determining a balance metric representing a distribution of optical weight among the plurality of digital objects within the first candidate layout.

15. The non-transitory computer readable storage medium of claim 10, further storing executable instructions that, when executed by the processing device, cause the processing device to:
modify the first graphics-processing-unit thread to use the first candidate layout as an input for performing operations; and
modify the second graphics-processing-unit thread to use the second candidate layout as an additional input for performing operations.

16. The non-transitory computer readable storage medium of claim 10, further storing executable instructions that, when executed by the processing device, cause the processing device to:
modify the first graphics-processing-unit thread to use the second candidate layout as an input for performing operations; and
modify the second graphics-processing-unit thread to use the first candidate layout as an additional input for performing operations.

17. The non-transitory computer readable storage medium of claim 16, further storing executable instructions that, when executed by the processing device, cause the processing device to:
generate a third candidate layout of the plurality of digital objects and a fourth candidate layout of the plurality of digital objects by performing concurrent and randomly selected operations of different operation magnitudes on certain digital objects of the plurality of digital objects, including:
performing, utilizing the first digital work group for the first entropy level and the first graphics-processing-unit thread, a randomly selected operation at a third operation magnitude on the first digital object within the first graphics-processing-unit thread; and
performing, utilizing the second digital work group for the second entropy level and the second graphics-processing-unit thread, an additional randomly selected operation at a fourth operation magnitude on the second digital object within the second graphics-processing-unit thread; and
determine a third design score for the third candidate layout based on design metrics of the third candidate layout and a fourth design score for the fourth candidate layout based on design metrics of the fourth candidate layout.

18. The non-transitory computer readable storage medium of claim 17, further storing executable instructions that, when executed by the processing device, cause the processing device to generate the modified layout of the plurality of digital objects by selecting a layout corresponding to a highest design score from among the first candidate layout, the second candidate layout, the third candidate layout, and the fourth candidate layout.

19. A computer-implemented method comprising:
detecting a digital design document having an initial layout of a plurality of digital objects;
a step for generating a first candidate layout of the plurality of digital objects and a second candidate layout of the plurality of digital objects;
determining a first design score for the first candidate layout based on design metrics of the first candidate layout and a second design score for the second candidate layout based on design metrics of the second candidate layout; and
generating a modified layout of the plurality of digital objects based on a comparison of the first design score and the second design score.

20. The computer-implemented method of claim 19, further comprising:
determining that the first candidate layout is valid based on a measure of overlap of the plurality of digital objects within the first candidate layout; and
based on determining that the first candidate layout is valid, determining the first design score for the first candidate layout.

* * * * *